(12) United States Patent
Maejima et al.

(10) Patent No.: US 12,539,844 B2
(45) Date of Patent: Feb. 3, 2026

(54) PARKING ASSIST APPARATUS

(71) Applicants: TOYOTA JIDOSHA KABUSHIKI KAISHA, Toyota (JP); DENSO CORPORATION, Kariya (JP)

(72) Inventors: Kohei Maejima, Nagakute (JP); Daiki Maruki, Toyota (JP); Yuki Minase, Toyota (JP); Yu Hiei, Nagoya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 279 days.

(21) Appl. No.: 18/325,354

(22) Filed: May 30, 2023

(65) Prior Publication Data
US 2023/0382370 A1    Nov. 30, 2023

(30) Foreign Application Priority Data

May 31, 2022    (JP) .................................. 2022-088886

(51) Int. Cl.
*B60W 30/06*    (2006.01)
*B60W 50/14*    (2020.01)
*B60W 60/00*    (2020.01)

(52) U.S. Cl.
CPC ............ *B60W 30/06* (2013.01); *B60W 50/14* (2013.01); *B60W 60/001* (2020.02);
(Continued)

(58) Field of Classification Search
CPC .... B60W 30/06; B60W 50/14; B60W 60/001; B60W 2050/146; B60W 2520/06; B60W 2554/80; B62D 15/028
See application file for complete search history.

(56) References Cited

U.S. PATENT DOCUMENTS 9,522,661 B2    12/2016    Inoue et al.
9,604,638 B2    3/2017    Kiyokawa et al.
(Continued)

FOREIGN PATENT DOCUMENTS

DE    10 2010 023 162 A1    12/2011
DE    10 2013 015 348 A1    4/2014
(Continued)

OTHER PUBLICATIONS

Extended European Search Report issued Oct. 20, 2023 in Application No. 23175909.3.

*Primary Examiner* — Abby Lin
*Assistant Examiner* — Renee LaRose
(74) *Attorney, Agent, or Firm* — Sughrue Mion, PLLC

(57) ABSTRACT

A parking assist apparatus includes an image pickup device, a three-dimensional object information acquisition device, and a control unit which executes parking assist control. The control unit registers in a storage device a path along which the vehicle has traveled when the driver has driven the vehicle from a start position to a parking position as a registered path together with a feature point extracted from a surrounding of the path and a three-dimensional object included in the three-dimensional object information, calculates, when a feature point and a three-dimensional object are detected, the registered path based on the positions of the feature point and the three-dimensional object, and notifies the driver, by display or a sound, of a first section in which the parking assist control can be started when a start condition which is satisfied when it is determined that the parking assist control can be started is satisfied.

8 Claims, 17 Drawing Sheets

(52) U.S. Cl.
CPC ... *B60W 2050/146* (2013.01); *B60W 2520/06* (2013.01); *B60W 2554/80* (2020.02)

(56) References Cited

U.S. PATENT DOCUMENTS

| | | |
|---|---|---|
| 9,738,276 B2 | 8/2017 | Kiyokawa et al. |
| 9,828,028 B2 | 11/2017 | Ishijima et al. |
| 9,836,658 B2 | 12/2017 | Kiyokawa et al. |
| 9,875,655 B2 | 1/2018 | Kiyokawa et al. |
| 10,031,227 B2 | 7/2018 | Kiyokawa et al. |
| 10,150,486 B2 | 12/2018 | Hoshino et al. |
| 10,239,520 B2 | 3/2019 | Tomozawa et al. |
| 10,377,416 B2 | 8/2019 | Fukukawa et al. |
| 2006/0287826 A1* | 12/2006 | Shimizu ............... B60Q 1/0023 701/431 |
| 2013/0085637 A1* | 4/2013 | Grimm .............. B62D 15/0285 701/25 |
| 2020/0062242 A1* | 2/2020 | Hayakawa ......... B62D 15/0285 |
| 2021/0107458 A1 | 4/2021 | Hiei |
| 2022/0227387 A1 | 7/2022 | Ozaki et al. |
| 2022/0237927 A1* | 7/2022 | Hiei ....................... G06V 10/60 |

FOREIGN PATENT DOCUMENTS

| | | |
|---|---|---|
| JP | 2021-062717 A | 4/2021 |
| WO | 2021002219 A1 | 1/2021 |

\* cited by examiner

PARKING ASSIST APPARATUS

BACKGROUND OF THE INVENTION

1. Field of the Invention

The present invention relates to a parking assist apparatus which executes parking assist control including control of parking a vehicle in a predetermined parking position by automatically moving the vehicle along a path registered in advance.

2. Description of the Related Art

Hitherto, there has been known a parking assist apparatus which executes parking assist control of automatically parking a vehicle in a registered parking position, the registered parking position being a parking position (parking space) of the vehicle registered in advance.

For example, in Japanese Patent Application Laid-open No. 2021-062717, there is described a parking assist apparatus which executes the parking assist control by using feature points of an entrance (entrance feature points) of the registered parking position. Specifically, the parking assist apparatus extracts the entrance feature points of a parking position which the driver wishes to register from a taken image obtained by photographing the parking position, and registers the parking position in association with the entrance feature points as a registered parking position. After the registration, the parking assist apparatus searches for entrance feature points from a taken image obtained by photographing a surrounding of the vehicle. When an entrance feature point is detected, the parking assist apparatus executes the parking assist control by calculating a path to the registered parking position registered in association with the entrance feature point, and automatically moving the vehicle along the path.

The parking assist apparatus of Japanese Patent Application Laid-open No. 2021-062717 is configured to calculate the path to the registered parking position by searching for entrance feature points of the registered parking position. For this reason, in order to start the parking assist control, the vehicle is required to be near the registered parking position (more precisely, close enough to enable the parking assist apparatus to detect an entrance feature point), and thus there is room for improvement in terms of convenience.

Therefore, in recent years, research and development have been conducted on a parking assist apparatus which executes parking assist control by registering a path to the parking position instead of registering the entrance feature points. This parking assist apparatus registers a path along which the vehicle has traveled when the driver has driven the vehicle from a "position from which the driver wishes to start registration (registration start position)" to the "parking position which the driver wishes to register (registered parking position)." Specifically, the registration start position is registered in association with the positions of the feature points existing in the surrounding of the registration start position and the positions of three-dimensional objects of the surrounding. The positions of the three-dimensional objects can be acquired from, for example, an ultrasonic sensor. The path is registered in association with the registration start position as a group of relative positions of the vehicle with respect to the registration start position. The relative positions can be calculated, for example, each time the vehicle travels a predetermined distance based on a "steered angle of steered wheels" and an "amount of rotation of the wheels" from the registration start position. Information on the feature points and the three-dimensional objects registered in association with the registration start position is hereinafter also referred to as "registration start position surrounding information."

When the registration start position is detected based on the registration start position surrounding information while the vehicle is traveling at a vehicle speed equal to or lower than a predetermined vehicle speed threshold value, the parking assist apparatus notifies (proposes to) the driver by using a sound, for example, that the parking assist control can be started (is available). When the driver stops the vehicle and presses a predetermined start button based on the notification, the parking assist apparatus starts the parking assist control along the path registered in association with the registration start position. With this configuration, the parking assist control can be started even when the vehicle is positioned at a point relatively distant from the registered parking position, and thus convenience is improved.

However, in the above-mentioned configuration, the notification is performed while the vehicle is traveling, and hence there is a possibility that the vehicle has already passed the registration start position at the moment when the driver presses the start button. In this case, the parking assist apparatus cannot properly acquire the registration start position surrounding information, and hence the path cannot be calculated (recreated). As a result, the parking assist control cannot be started. For the driver, a situation arises in which the parking assist control does not start even though the driver has pressed the start button based on the notification, and thus convenience is reduced in another aspect.

SUMMARY OF THE INVENTION

The present invention has been made to address the problems described above. That is, one object of the present invention is to provide a parking assist apparatus which enables, when parking assist control can be started during traveling of a vehicle, a driver to easily recognize how long the state in which the parking assist control can be started is to continue.

According to at least one embodiment of the present invention, there is provided a parking assist apparatus (hereinafter referred to as "apparatus of the present invention") including: an image pickup device (11) configured to acquire image information by photographing a surrounding of a vehicle; a three-dimensional object information acquisition device (12, 13) configured to acquire three-dimensional object information including a position of a three-dimensional object (31 to 36) present in the surrounding of the vehicle; and a control unit (10) configured to execute parking assist control including control of registering, in advance, a path (R) along which the vehicle has traveled when a driver of the vehicle has driven the vehicle from a predetermined start position (P1) to a predetermined parking position (P3) as a registered path (Rreg), and parking the vehicle in the predetermined parking position (Pr) by automatically moving the vehicle along the registered path (Rreg), the control unit (10) being configured to: each time the vehicle travels a predetermined distance (d1, d2) during a period in which the driver is driving the vehicle from the predetermined start position (P1) to the predetermined parking position (P3), extract a feature point (F) of a road surface from an overhead view image generated based on the image information, acquire a position of the three-dimensional object (31 to 36) included in the three-dimensional object information, and calculate a relative position of the vehicle with respect to the predetermined start position (P1); register a group of position coordinates of the relative positions of the vehicle with respect to a predetermined reference point (O) in a storage device (ROM) as the registered path (Rreg) together with a position coordinate of the feature point (F) and a position coordinate of the three-dimensional object (31 to 36) with respect to the predetermined reference point (O); calculate, when the feature point (F) and/or the three-dimensional object (31 to 36) registered is/are detected near the registered path (Rreg) based on the overhead view image and the three-dimensional object information, the registered path (Rreg) based on the position coordinate of the feature point (F) and/or the position coordinate of the three-dimensional object (31 to 36); and notify the driver, by display or a sound, of a first section in which the parking assist control is startable when a start condition is satisfied ("Yes" in Step 745, "Yes" in Step 1710), the start condition being satisfied when it is determined that the parking assist control is startable based on the relative position and a relative azimuth of the vehicle with respect to the registered path (Rreg) (Step 750, Step 1720).

In the apparatus of the present invention, when the start condition (condition satisfied when it is determined that the parking assist control is available) is satisfied, the driver is notified, by display or a sound, of the first section (section in which the parking assist control can be started). When the first section is notified by display, the driver can visually recognize the section in which the parking assist control can be started. Meanwhile, when the first section is notified by a sound, the driver can aurally recognize the section in which the parking assist control can be started. Therefore, the driver can easily recognize how long the state in which the parking assist control can be started is to continue. With this configuration, it is possible to greatly reduce the possibility that the driver passes through the section in which the parking assist control is possible without noticing the section. In addition, the parking assist control can be started after the vehicle has moved to a point at which the driver can easily stop the vehicle among the section in which the parking assist control can be started. As a result, the convenience of the parking assist control can be significantly improved. In embodiments of the present invention, the overhead view image is referred to as "specific overhead view image."

In addition, in the apparatus of the present invention, not only the positions of the feature points and the three-dimensional objects of the surrounding at the registration start position, but also the positions of the feature points and the three-dimensional objects of the surrounding of the path (a group of the position coordinates of the relative positions of the vehicle with respect to the reference point) are registered. More specifically, the positions of the feature points and the three-dimensional objects are converted into position coordinates with respect to the reference point and then registered. Therefore, the parking assist control can be started even in the middle of the registered path, and hence the convenience of the parking assist control is further improved.

In one aspect of the present invention, the parking assist apparatus further includes a display screen (25*a*) arranged at a position visible to the driver, and the control unit (10) is configured to display, when the start condition is satisfied ("Yes" in Step 745), the first section on the display screen (25*a*) as one of an area (R1) including the registered path (Rreg) or a symbol (A1) or graphic indicating a travel direction of the vehicle on the registered path (Rreg) (Step 750).

With this configuration, the driver can appropriately visually recognize the first section by confirming the area or the symbol or graphic displayed on the display screen. In particular, when the first section is displayed as a symbol or graphic indicating the travel direction of the vehicle, the driver can appropriately grasp the travel direction of the vehicle.

In one aspect of the present invention, the control unit (10) is configured to notify the driver, by display, of a second section in which the vehicle is enabled to merge with at least the registered path (Rreg) when a merging condition is satisfied ("Yes" in Step 770), the merging condition being satisfied when it is determined that the vehicle is enabled to merge with the registered path (Rreg) based on the relative position and the relative azimuth of the vehicle with respect to the registered path (Rreg) in a case when the start condition is not satisfied (Step 775).

In the apparatus of the present invention, when the merging condition is satisfied, the driver is notified of the second section (section in which the vehicle is enabled to merge with at least the registered path) by display. Therefore, the driver can visually recognize that the parking assist control can be started by driving (moving) the vehicle so as to merge with the second section. With this configuration, even when the parking assist control cannot be started at the current time, the control can be started by driving the vehicle to an appropriate position and in an appropriate direction, and thus situations in which the parking assist control can be used increase and the convenience of the control is further improved.

In one aspect of the present invention, the control unit (10) is configured to provide, by display or a sound, an advisory message regarding a driving operation required for merging with the second section when the merging condition is satisfied ("Yes" in Step 770) (Step 775).

With this configuration, by driving the vehicle based on the advisory message, the driver can appropriately merge the vehicle with the second section (that is, can reduce the possibility of the vehicle merging with the second section from the opposite direction).

In one aspect of the present invention, the parking assist apparatus further includes a display screen (25*a*) arranged at a position visible to the driver, and the control unit (10) is configured to display, when the merging condition is satisfied ("Yes" in Step 770), the second section on the display screen (25*a*) as one of an area (R2) including the registered path (Rreg) or a symbol (A2) or graphic indicating a travel direction of the vehicle on the registered path (Rreg) (Step 775).

With this configuration, the driver can appropriately visually recognize the second section by confirming the area or the symbol or graphic displayed on the display screen. In particular, when the second section is displayed as a symbol or graphic indicating the travel direction of the vehicle, the driver can grasp in which direction the vehicle is to be driven (moved), and thus the vehicle can be more properly merged with the second section.

In one aspect of the present invention, the parking assist apparatus further includes a display screen (25*a*) arranged at a position visible to the driver, and the control unit (10) is configured to display, when the start condition is satisfied ("Yes" in Step 1710), a remaining distance (dr) as the first section on the display screen (25*a*) (Step 1720), the remaining distance being a distance from a current position to a position at which the start condition becomes unsatisfied under an assumption that the vehicle continues to travel straight along a current travel direction.

With this configuration, the driver can appropriately visually recognize the first section by confirming the remaining distance displayed on the display screen.

In one aspect of the present invention, the parking assist apparatus further includes an audio output device (126) configured to output a predetermined sound, and the control unit (110) is configured to cause, when the start condition is satisfied ("Yes" in Step 1710), the audio output device (126) to output a sound corresponding to a remaining distance as the first section, the remaining distance being a distance from a current position to a position at which the start condition becomes unsatisfied under an assumption that the vehicle continues to travel straight along a current travel direction.

With this configuration, the driver can appropriately grasp the first section by listening to the sound (sound corresponding to the remaining distance) output from the audio output device.

In the above description, in order to facilitate understanding of the invention, a reference symbol used in embodiments of the present invention is enclosed in parentheses and is assigned to each of the constituent features of the invention corresponding to the embodiments. However, each of the constituent features of the invention is not limited to that of the embodiments defined by the reference symbol.

DESCRIPTION OF THE EMBODIMENTS

First Embodiment

Figure 1:
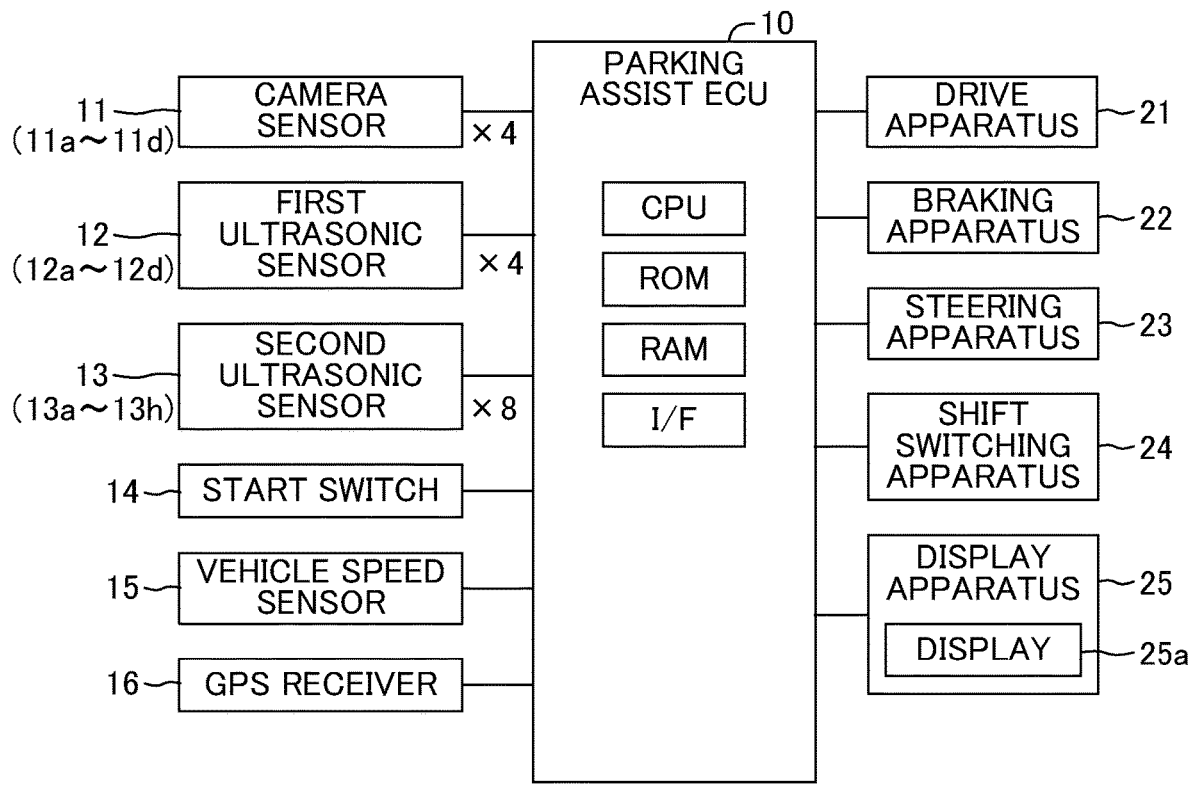
FIG. 1 is a schematic configuration diagram of a parking assist apparatus according to a first embodiment of the present invention.

A parking assist apparatus according to a first embodiment of the present invention (hereinafter also referred to as "apparatus of the first embodiment") is now described with reference to the drawings. As illustrated in FIG. 1, the apparatus of the first embodiment includes a parking assist ECU 10, and camera sensors 11, first ultrasonic sensors 12, second ultrasonic sensors 13, a start switch 14, a vehicle speed sensor 15, a GPS receiver 16, a drive apparatus 21, a braking apparatus 22, a steering apparatus 23, a shift switching apparatus 24, and a display apparatus 25, which are connected to the parking assist ECU 10. The parking assist ECU 10 includes a microcomputer as a main part. "ECU" is an abbreviation for electronic control unit. The microcomputer includes, for example, a CPU, a read-only memory (ROM), a random-access memory (RAM), and an interface (I/F). The CPU implements various functions by executing instructions (programs and routines) stored in the ROM. A part of those functions may be executed by another ECU (not shown). A vehicle equipped with the apparatus of the first embodiment is hereinafter referred to as "own vehicle."

The parking assist ECU 10 is configured to acquire signals (information) transmitted by the above-mentioned elements 11 to 16 each time a predetermined time elapses, and to control the apparatus 21 to 25 based on the acquired signals. The parking assist ECU 10 is hereinafter also simply referred to as "ECU 10."

Figure 2:
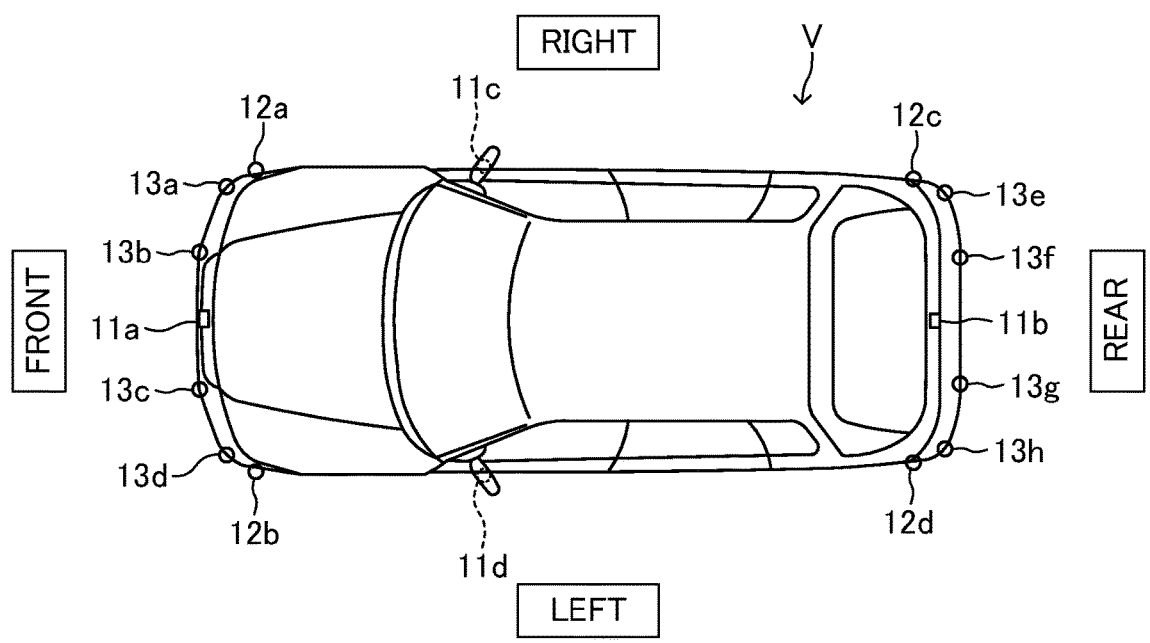
FIG. 2 is a plan view of an own vehicle for illustrating installation positions of camera sensors, first ultrasonic sensors, and second ultrasonic sensors.

As illustrated in FIG. 2, the camera sensors 11 (image pickup device) include a camera sensor 11a arranged at a center portion of a front end of the own vehicle, a camera sensor 11b arranged at a center portion of a rear end of the own vehicle, a camera sensor 11c arranged at a lower portion of a right side-view mirror, and a camera sensor 11d arranged at a lower portion of a left side-view mirror.

Each camera sensor 11 acquires image data (image information) by photographing an area corresponding to a photographing region. Specifically, the camera sensor 11a photographs a front area of the own vehicle to acquire front image data. The camera sensor 11b photographs a rear area of the own vehicle to acquire rear image data. The camera sensor 11c photographs an area on the right side of the own vehicle to acquire right-side image data. The camera sensor 11*d* photographs an area on the left side of the own vehicle to acquire left-side image data. The camera sensors 11*a* to 11*d* transmit the photographed image data to the ECU 10. Each of the camera sensors 11*a* to 11*d* has basically the same configuration, except that the photographing region is different from each other. The number and installation positions of the camera sensors 11 are not limited to the example described above.

The ECU 10 generates a travel direction image which displays an area in the travel direction of the own vehicle based on the front image data or the rear image data. Specifically, when the own vehicle is moving forward or stops while moving forward, the ECU 10 generates a travel direction image showing the front area of the own vehicle based on the front image data. Meanwhile, when the own vehicle is reversing or stops while reversing, the ECU 10 generates a travel direction image showing the rear area of the own vehicle based on the rear image data. The ECU 10 displays any one of those travel direction images on a display 25*a* of the display apparatus 25 under a predetermined condition (described later).

Further, based on the front image data, the rear image data, the right-side image data, and the left-side image data, the ECU 10 generates an image that looks like an overhead image of the surrounding area of the own vehicle from directly above. Then, a planar image of the vehicle stored in advance in the ROM of the ECU 10 is superimposed on this image to generate an overhead view image. The ECU 10 displays the overhead view image on the display 25*a* under a predetermined condition (described later).

The first ultrasonic sensors 12 (three-dimensional object information acquisition device) include a first ultrasonic sensor 12*a* and a first ultrasonic sensor 12*b* arranged at a right front corner portion and a left front corner portion of the own vehicle, respectively, and a first ultrasonic sensor 12*c* and a first ultrasonic sensor 12*d* arranged at a right rear corner portion and a left rear corner portion of the own vehicle, respectively.

The first ultrasonic sensors 12 transmit ultrasonic waves to a predetermined range and receive reflected waves reflected from three-dimensional objects. Then, the first ultrasonic sensors 12 calculate the position of each three-dimensional object (that is, the distance from the own vehicle to the three-dimensional object and the azimuth of the three-dimensional object with respect to the own vehicle) based on the time from transmission to reception of the ultrasonic waves, and acquire the calculation result as first three-dimensional object information (in other words, detect three-dimensional objects). Specifically, the first ultrasonic sensors 12*a* to 12*d* acquire the first three-dimensional object information on the three-dimensional objects present in an oblique right front area, an oblique left front area, an oblique right rear area, and an oblique left rear area, respectively, of the own vehicle, and transmit the acquired first three-dimensional object information to the ECU 10. Each of the first ultrasonic sensors 12*a* to 12*d* has basically the same configuration, except that the transmission ranges of ultrasonic waves are different from each other. The first ultrasonic sensors 12 are configured to acquire only the calculation results of stationary three-dimensional objects (for example, a pole or a curbstone) as the first three-dimensional object information. The number and installation positions of the first ultrasonic sensors 12 are not limited to the example described above.

The second ultrasonic sensors 13 (three-dimensional object information acquisition device) include second ultrasonic sensors 13*a* to 13*d* each dispersedly arranged at the front end of the own vehicle, and second ultrasonic sensors 13*e* to 13*h* each dispersedly arranged at the rear end of the own vehicle.

The second ultrasonic sensors 13 have the same basic configuration as that of the first ultrasonic sensors 12, but are different in that the second ultrasonic sensors 13 are configured to detect three-dimensional objects positioned closer to the own vehicle. The second ultrasonic sensors 13 calculate the position of the three-dimensional objects based on the time from transmission to reception of the ultrasonic waves, and acquire the calculation results as second three-dimensional object information (in other words, detect the three-dimensional objects). Specifically, the second ultrasonic sensors 13*a* to 13*d* acquire the second three-dimensional object information on the three-dimensional objects present in an oblique-right front area, a front right-side area, a front left-side area, and an oblique-left front area of the own vehicle, respectively, and transmit the acquired second three-dimensional object information to the ECU 10. The second ultrasonic sensors 13*e* to 13*h* acquire the second three-dimensional object information on the three-dimensional objects present in an oblique-right rear area, a rear right-side area, a rear left-side area, and an oblique-left rear area of the own vehicle, respectively, and transmit the acquired second three-dimensional object information to the ECU 10. Each of the second ultrasonic sensors 13*a* to 13*h* has basically the same configuration, except that the transmission ranges of ultrasonic waves are different from each other. The second ultrasonic sensors 13 are configured to acquire only the calculation results of stationary three-dimensional objects as the second three-dimensional object information. The number and installation positions of the second ultrasonic sensors 13 are not limited to the example described above.

The first three-dimensional object information and the second three-dimensional object information are hereinafter collectively referred to as "three-dimensional object information." Further, the apparatus of the first embodiment may include radar sensors in addition to or instead of the first and second ultrasonic sensors 12 and 13. The radar sensors may be configured to acquire three-dimensional object information including the positions of the three-dimensional objects present in the surrounding of the own vehicle.

Returning to FIG. 1, the start switch 14 is a switch which is pressed (operated) by the driver to start or stop a registration mode, which is described later.

The vehicle speed sensor 15 detects the speed of the own vehicle (vehicle speed), and transmits a signal representing the detected vehicle speed to the ECU 10. Strictly speaking, the vehicle speed sensor 15 is a wheel speed sensor.

The GPS receiver 16 receives GPS signals for calculating the absolute position (latitude and longitude) of the own vehicle, and transmits the received GPS signals to the ECU 10.

The drive apparatus 21 is an apparatus for applying a driving force for causing the own vehicle to travel to drive wheels of the own vehicle. The ECU 10 controls the driving force applied to the drive wheels by performing drive control which controls the operation of the drive apparatus 21. The type of the own vehicle is not particularly limited, and examples of the own vehicle include an engine vehicle, a hybrid electric vehicle (HEV), a plug-in hybrid electric vehicle (PHEV), a fuel cell electric vehicle (FCEV), and a battery electric vehicle (BEV).

The braking apparatus 22 is an apparatus for applying a braking force for braking the own vehicle to wheels of the own vehicle. The ECU 10 controls the braking force applied to the wheels by performing braking control which controls the operation of the braking apparatus 22.

The steering apparatus 23 is an apparatus for applying a steering torque for steering steered wheels of the own vehicle to a steering mechanism (not shown). The ECU 10 controls the steering torque applied to the steering mechanism (and thus a steered angle of the steered wheels) by performing steering control which controls the operation of the steering apparatus 23.

The shift switching apparatus 24 is an apparatus for operating a transmission and/or a drive direction switching mechanism of the vehicle in accordance with the position (typically "D", "R", or "P", for example) of a shift lever (not shown). The ECU 10 automatically switches the position of the shift lever to control the transmission and/or the drive direction switching mechanism by performing shift switching control which controls the operation of the shift switching apparatus 24.

Figure 3:
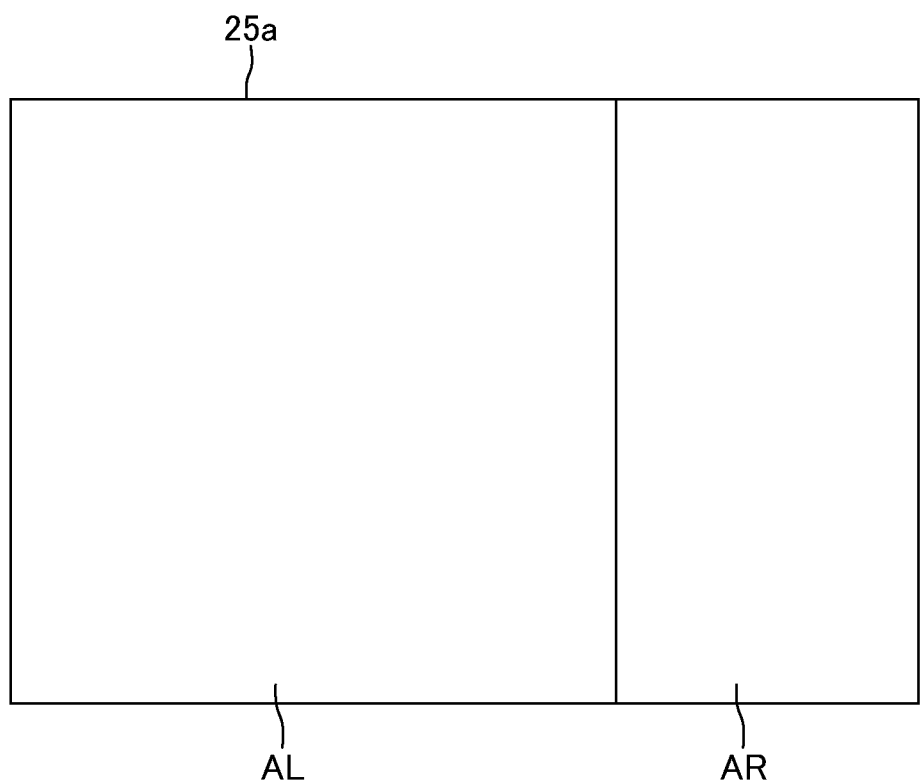
FIG. 3 is a diagram for illustrating a layout of a display area of a display screen.

The display apparatus 25 includes a display 25a (display screen) arranged at a position visible to the driver. The display apparatus 25 is typically a display apparatus included in a navigation system, and a touch panel can be used for the display 25a. As illustrated in FIG. 3, the display 25a includes a display area AL arranged on the left side and a display area AR arranged on the right side. Various images and messages including the travel direction image can be displayed in the display area AL, and various images including the overhead view image can be displayed in the display area AR. The ECU 10 controls the display apparatus 25 to display, in the display areas AL and AR of the display 25a, images corresponding to a control stage of parking assist control, which is described later.

<Details of Operation>

Next, the details of the operation of the ECU 10 are described. The ECU 10 is configured such that the ECU 10 can execute parking assist control. The parking assist control includes two types of modes: a registration mode and a parking assist mode. The registration mode is a mode in which a path along which the vehicle has traveled when the driver has driven the own vehicle from a given position to a parking position which the driver wishes to register (hereinafter referred to as "registered parking position") can be registered in advance in the ROM of the ECU 10 as a registered path. The parking assist mode is a mode in which "control of parking an own vehicle in a registered parking position by automatically moving the own vehicle along a registered path" and "control of parking the own vehicle in the registered parking position by assisting the own vehicle to move along the registered path" are executed as parking assist control. The former control is performed by the ECU 10 executing drive control, braking control, steering control, and shift switching control. The latter control is performed by the ECU 10 performing at least one of drive control, braking control, steering control, or shift switching control, and the driver performing the rest of the driving operation (for example, operating the shift lever). The first embodiment exemplifies a case in which the ECU 10 executes the former control as the parking assist control.

Registration Mode

Figure 4:
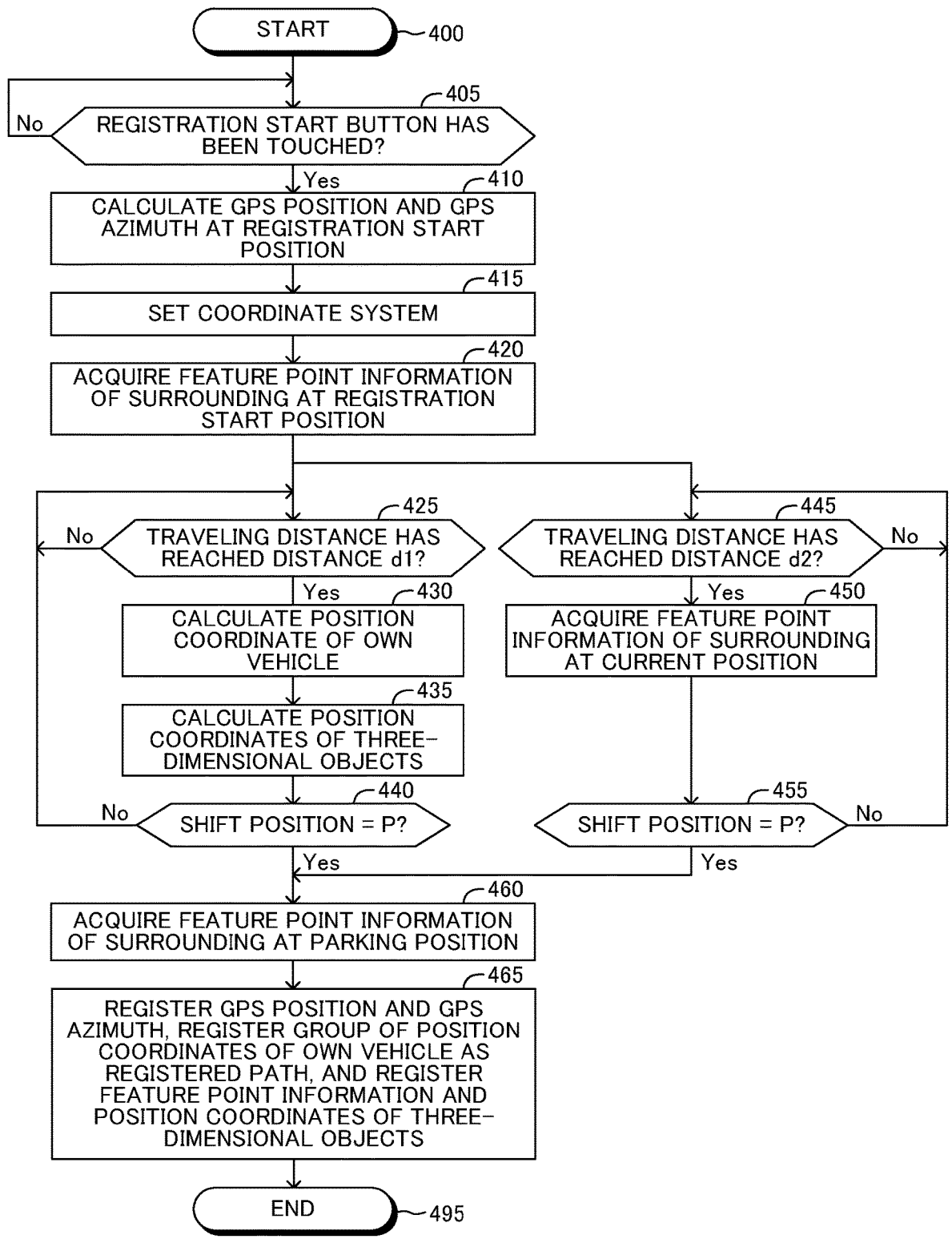
FIG. 4 is a flowchart for illustrating a flow of processing by a CPU of a parking assist ECU in a registration mode.
Figure 5:
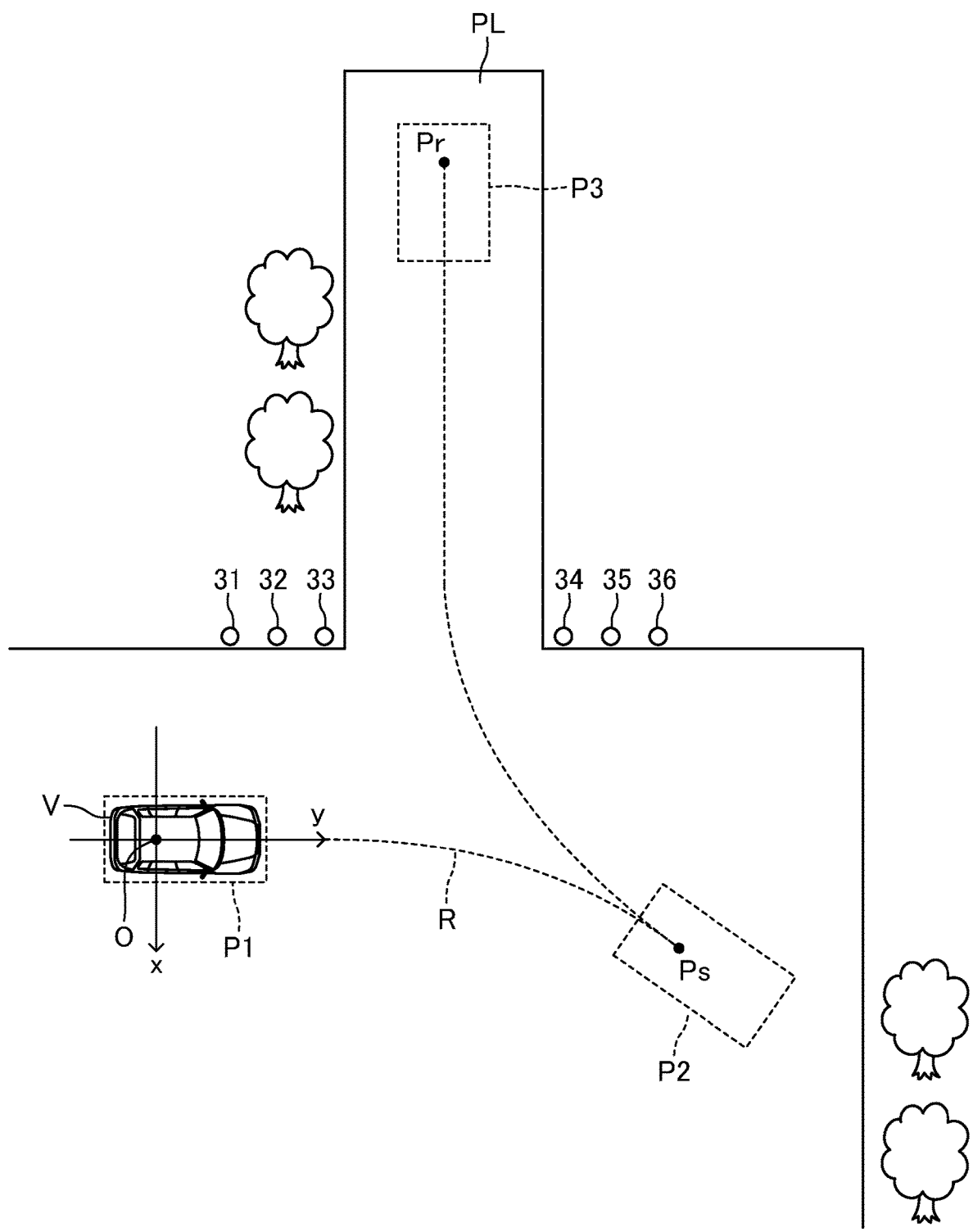
FIG. 5 is a diagram for illustrating an example of a scene in which a path is registered in the registration mode.

First, the registration mode is described with reference to FIG. 4 to FIG. 6B. FIG. 4 is a flowchart for illustrating a flow of processing by the CPU of the ECU 10 in the registration mode. FIG. 5 is a diagram for illustrating an example of a scene in which a path R is registered when the driver has driven an own vehicle V from a position P1 to a position P3.

As illustrated in FIG. 5, the position P3 is positioned within a parking space PL at the home of the driver. The position P1 is positioned relatively far from the position P3. Six poles 31 to 36 are arranged near the entrance of the home. In this example, the driver intends to perpendicularly park at the position P3 by driving the own vehicle V forward from the position P1 to a position P2, then reversing from the position P2 to the position P3 (see the dashed lines).

When the driver presses the start switch 14 under a state in which the own vehicle V is stopped at the position P1 (that is, the position at which the driver wishes to start path registration (hereinafter referred to as "registration start position")), the registration mode starts, and as a result, the registration mode is started in Step 400 of FIG. 4. When the registration mode is started, the CPU displays a registration start button (not shown) on the display 25a. Then, the CPU advances the process to Step 405, and determines whether or not the registration start button has been touched by the driver. When the registration start button has not been touched ("No" in Step 405), the CPU returns the process to Step 405. Meanwhile, when the registration start button has been touched ("Yes" in Step 405), the CPU advances the process to Step 410, and starts path registration processing. The CPU may be configured to advance the process to Step 410 based on a voice instruction from the driver (for example, a voice instruction "Start registration") instead of touching the registration start button.

In Step 410, the CPU calculates the absolute position (latitude and longitude) and the azimuth of the own vehicle V at the registration start position based on the GPS signals transmitted from the GPS receiver 16. The azimuth of the own vehicle V can be calculated by time-differentiating the absolute position. The absolute position and the azimuth of the own vehicle V calculated based on the GPS signals are hereinafter referred to as "GPS position" and "GPS azimuth," respectively. The CPU stores the GPS position and the GPS azimuth of the registration start position in the RAM of the ECU 10 (the RAM of the ECU 10 is hereinafter simply referred to as "RAM"). Note that strictly speaking, the CPU is constantly calculating the GPS position during a period in which an ignition switch is in an ON state. Then, in Step 405, the GPS azimuth at the time when the registration start button is touched is held (stored in the RAM).

Then, the CPU advances the process to Step 415 and sets a coordinate system. Specifically, the CPU sets an origin O at a given position within the position P1 (in the first embodiment, the center of the own vehicle V in the vehicle width direction), sets the x-axis so that the vehicle width right-side direction is the +x direction, and sets the y-axis so that the front direction in the front-rear axis direction (the direction perpendicular to the vehicle width direction) is the +y direction (see FIG. 5).

Next, the CPU advances the process to Step 420, and acquires feature point information of the surrounding at the registration start position. The feature point information is information including, for example, the position coordinate(s) and grayscale information of a feature point(s) F. Methods of acquiring the feature point information are well known, and thus only a brief description is given below (for details, see Japanese Patent Application Laid-open No. 2021-062684).

Figure 6A:
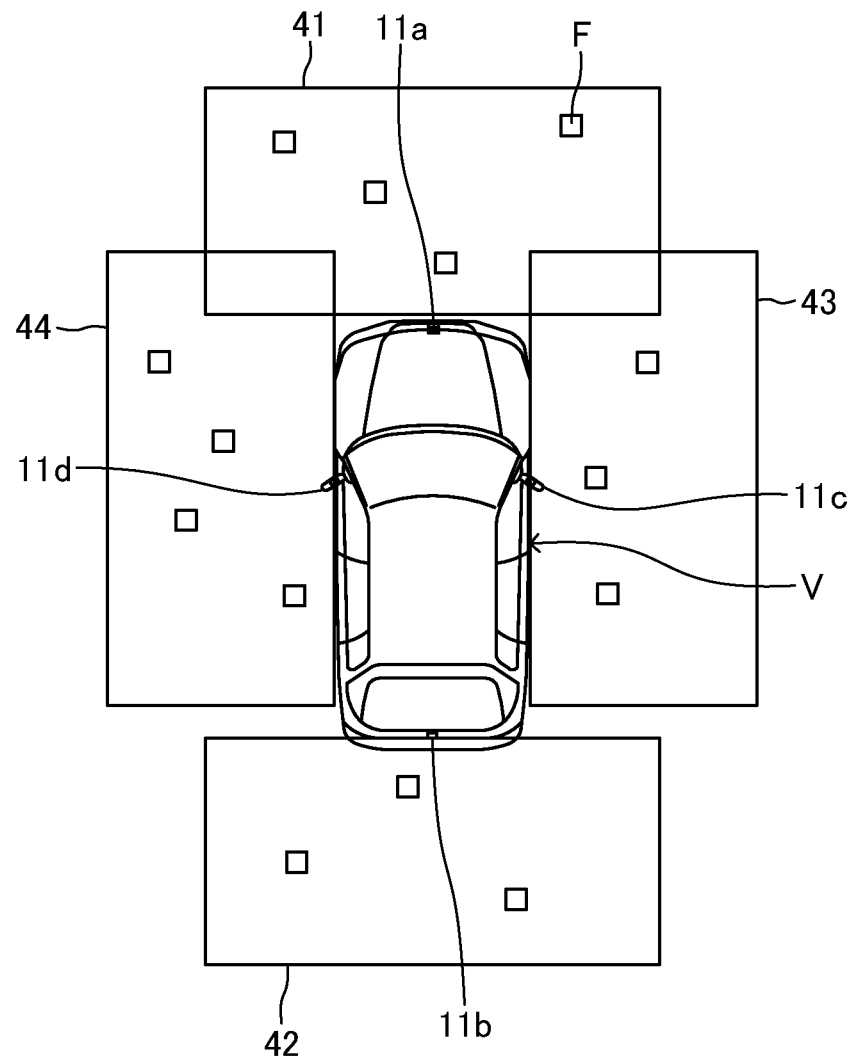
FIG. 6A is a diagram for illustrating a photographing region on a road surface corresponding to an overhead view image generated at a registration start position.

First, the CPU uses the image data transmitted from the camera sensors 11 to generate overhead view image data (image data obtained by converting the image data into an image viewed from above). Next, the CPU generates an overhead view image based on the overhead view image data. That is, the CPU generates a front overhead view image and a rear overhead view image based on front overhead view image data and rear overhead view image data, respectively, generated through use of the front image data and the rear image data, respectively. Further, the CPU generates a right-side overhead view image and a left-side overhead view image based on right-side overhead view image data and left-side overhead view image data, respectively, generated through use of the right-side image data and the left-side image data, respectively. FIG. 6A is a diagram for illustrating photographing regions 41 to 44 on the road surface corresponding to the overhead view images generated at the registration start position. The photographing regions 41 to 44 correspond to the front overhead view image, the rear overhead view image, the right-side overhead view image, and the left-side overhead view image, respectively. The photographing regions 41 to 44 all have rectangular shapes and are equal in size.

When the overhead view images have been generated, the CPU extracts feature points F by performing image analysis on the overhead view images. Here, each feature point F is a small square-shaped image (for example, a square image having 20 pixels on each side) including a portion having a relatively large change in luminance. In the example of FIG. 6A, the CPU extracts four feature points F from the front overhead view image, three feature points F from the rear overhead view image, three feature points F from the right-side overhead view image, and four feature points F from the left-side overhead view image. Then, the CPU calculates the position coordinate, the grayscale information, and the like of each feature point F, thereby acquiring the feature point information. Note that the overhead view images are images used for a specific purpose (extraction and detection of feature points), and thus the overhead view images are hereinafter also referred to as "specific overhead view images." The specific overhead view images are different from the above-mentioned overhead view images for display. The above description is description on the method of acquiring the feature point information.

The CPU stores the feature point information of the surrounding at the registration start position acquired in this way in the RAM.

Then, the CPU performs the processing steps of Step 425 to Step 440 and the processing steps of Step 445 to Step 455 in parallel. Those processing steps are now described in order below. When the CPU advances the process to Step 425, the CPU determines whether or not the traveling distance of the own vehicle V has reached a distance d1. The traveling distance can be calculated based on the amount of rotation of the wheels. The amount of rotation of the wheels can be calculated based on the signal transmitted from the vehicle speed sensor 15. In the first embodiment, the distance d1 is set to 1 cm, but the distance d1 is not limited to this value.

When the traveling distance has not yet reached the distance d1 ("No" in Step 425), the CPU returns the process to Step 425. Meanwhile, when the traveling distance has reached the distance d1 ("Yes" in Step 425), the CPU advances the process to Step 430.

In Step 430, the CPU calculates the position coordinate of the own vehicle V based on the steered angle of the steered wheels and the amount of rotation of the wheels. The steered angle of the steered wheels can be calculated based on a steering operation amount (for example, steering angle, steering torque, and steering angular speed) of a steering wheel (not shown) by the driver. The CPU stores the position coordinate of the own vehicle V in the RAM.

Next, the CPU advances the process to Step 435, and calculates the position coordinates of detected three-dimensional objects (for example, the poles 31 to 36 in the example of FIG. 5) based on the three-dimensional object information transmitted from the first ultrasonic sensors 12 and the second ultrasonic sensors 13 (in other words, converts the position of each three-dimensional object with respect to the own vehicle V into a position coordinate with respect to the origin O). The CPU stores the position coordinates of the three-dimensional objects in the RAM.

Thereafter, the CPU advances the process to Step 440, and determines whether or not the shift position of the shift lever is "P" based on a signal transmitted from a shift position sensor (not shown). When the shift position is not "P" ("No" in Step 440), the CPU returns the process to Step 425. Here, "the shift position is not 'P'" means that the driver is still driving the own vehicle V toward the parking position. Meanwhile, when the shift position is "P" ("Yes" in Step 440), the CPU advances the process to Step 460 (described later). Here, "the shift position is 'P'" means that the own vehicle V has reached the parking position (position P3 in the example of FIG. 5) and the driver has switched the shift lever to "P".

Meanwhile, when the CPU advances the process to Step 445, the CPU determines whether or not the traveling distance of the own vehicle V has reached a distance d2. In the first embodiment, the distance d2 is set to a predetermined value within the range of from 1 m to 5 m, but the distance d2 is not limited to values within this range.

When the traveling distance has not yet reached the distance d2 ("No" in Step 445), the CPU returns the process to Step 445. Meanwhile, when the traveling distance has reached the distance d2 ("Yes" in Step 445), the CPU advances the process to Step 450.

In Step 450, the CPU acquires the feature point information of the surrounding at the current position. That is, in the same manner as in the processing step of Step 420, the CPU generates specific overhead view images based on the overhead view image data generated through use of the image data. Then, the CPU acquires the feature point information by extracting the feature points F from the specific overhead view images. The photographing regions of the specific overhead view images generated in Step 450 are the same as the photographing regions 41 to 44 of Step 420 (see FIG. 6A). The CPU stores the feature point information of the surrounding at the current position in the RAM.

Thereafter, the CPU advances the process to Step 455, and determines whether or not the shift position of the shift lever is "P". When the shift position is not "P" ("No" in Step 455), the CPU returns the process to Step 445. Meanwhile, when the shift position is "P" ("Yes" in Step 455), the CPU advances the process to Step 460.

Figure 6B:
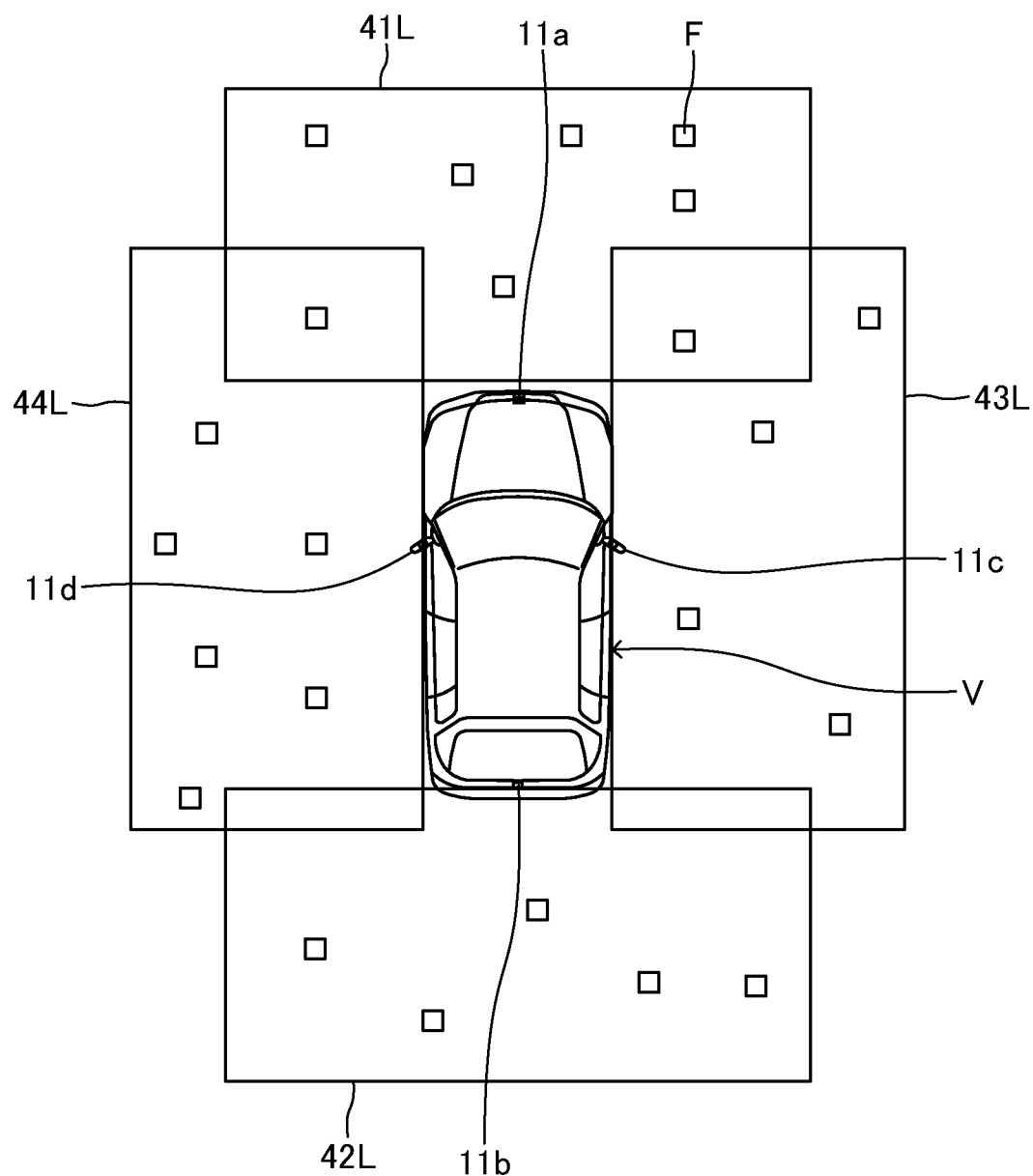
FIG. 6B is a diagram for illustrating a photographing region on the road surface corresponding to the overhead view image generated at a parking position.

In Step 460, the CPU acquires the feature point information of the surrounding at the parking position. That is, in the same manner as in the processing steps of Step 420 and Step 450, the CPU generates specific overhead view images based on the overhead view image data generated through use of the image data. Then, the CPU acquires the feature point information by extracting the feature points F from the specific overhead view images. However, in Step 460, the CPU is configured to generate specific overhead view images that are larger than the specific overhead view images generated in Step 420 and Step 450. FIG. 6B is a diagram for illustrating photographing regions 41L to 44L on the road surface corresponding to the specific overhead view images generated at the parking position. As illustrated in FIG. 6B, the photographing regions 41L to 44L all have a rectangular shape and are equal in size, but are larger than the photographing regions 41 to 44 (see FIG. 6A). With this configuration, the CPU can extract feature points F from a wider region, and hence there is a higher possibility that more feature points F can be extracted (see FIG. 6B). As a result, the parking position can be registered more accurately in Step 465, which is described later. The CPU stores the feature point information of the surrounding at the parking position in the RAM.

Then, the CPU advances the process to Step 465, and stores (registers) the GPS position and the GPS azimuth at the registration start position in the ROM of the ECU 10 as the registered GPS position and the registered GPS azimuth. In addition, the CPU stores (registers) a group of the position coordinates of the own vehicle V (group of the position coordinates on a path R from the origin O to a point Pr via a point Pc) as a registered path Rreg in the ROM. Further, the CPU stores (registers) the feature point information and (the group of) the position coordinates of the three-dimensional objects in the ROM. At this time, the CPU registers the three-dimensional objects as registered three-dimensional objects. As used herein, registering the feature point information of the surrounding at the registration start position is synonymous with registering the registration start position, and registering the feature point information of the surrounding at the parking position is synonymous with registering the parking position. The parking position registered in this way is hereinafter referred to as "registered parking position." As a result of the processing step of Step 465, the registered path Rreg, the feature point information of the surrounding thereof, and (the group of) the position coordinates of the three-dimensional objects are stored in the ROM together with the registered GPS position and the registered GPS azimuth. Those elements stored in the ROM are collectively registered in association with the registered parking position. This enables the elements to be registered for each registered parking position even when the apparatus of the first embodiment is configured to allow registration of a plurality of parking positions. After the processing step of Step 465 ends, the CPU advances the process to Step 495, and ends the registration processing for the path R.

In the first embodiment, the origin O is set inside the registration start position (position P1 in the example of FIG. 5), but the origin O is not limited to this configuration, and may be set outside the registration start position. In this case, in Step 420, the CPU may be configured to further perform processing of calculating the position coordinate of the own vehicle V (in other words, the starting point of the path R), and storing the calculated position coordinates in the RAM.

Parking Assist Mode

Figure 7A:
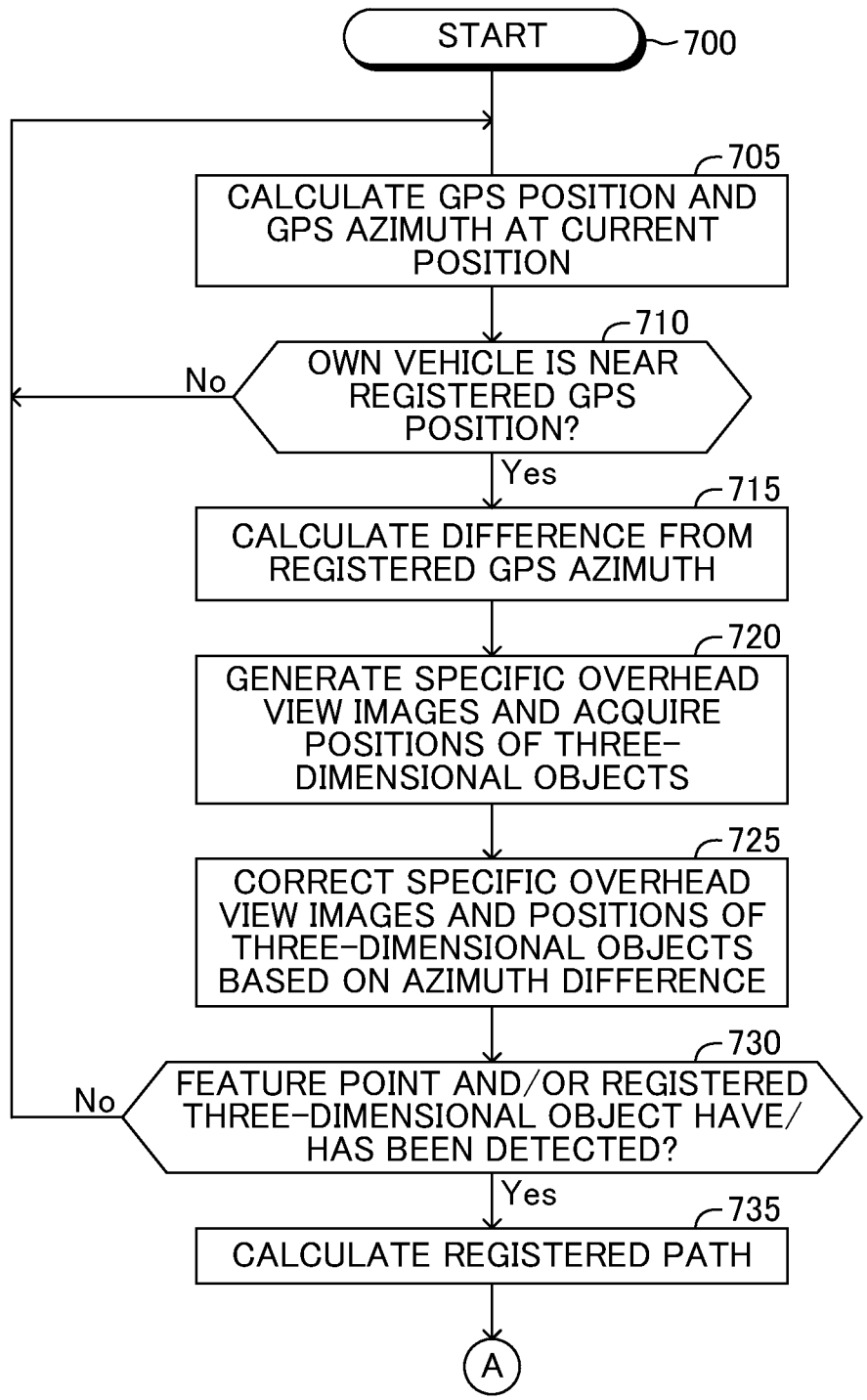
FIG. 7A is a flowchart (part 1) for illustrating a flow of processing by the CPU in a parking assist mode.
Figure 7B:
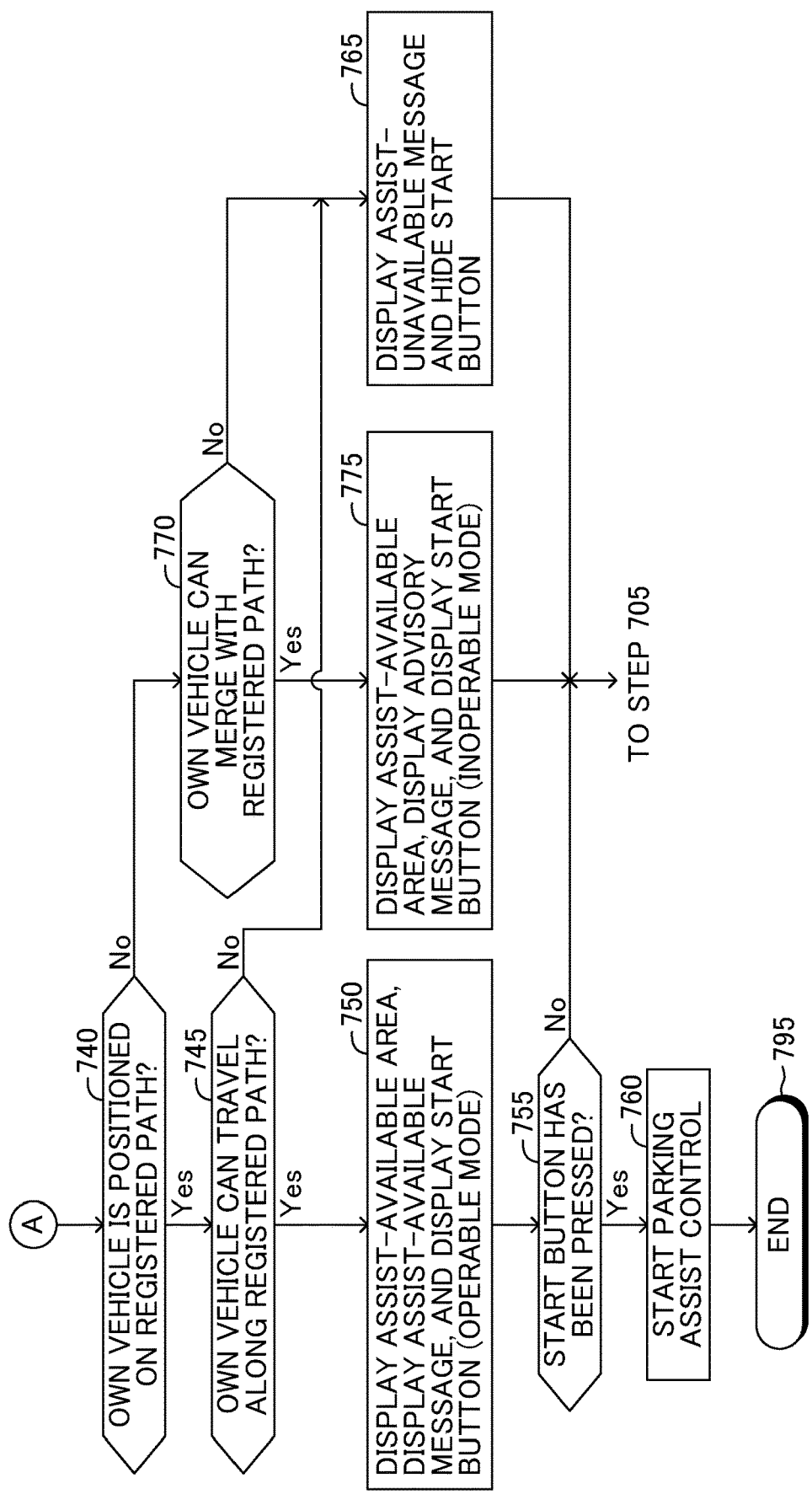
FIG. 7B is a flowchart (part 2) for illustrating a flow of processing by the CPU in the parking assist mode.
Figure 8:
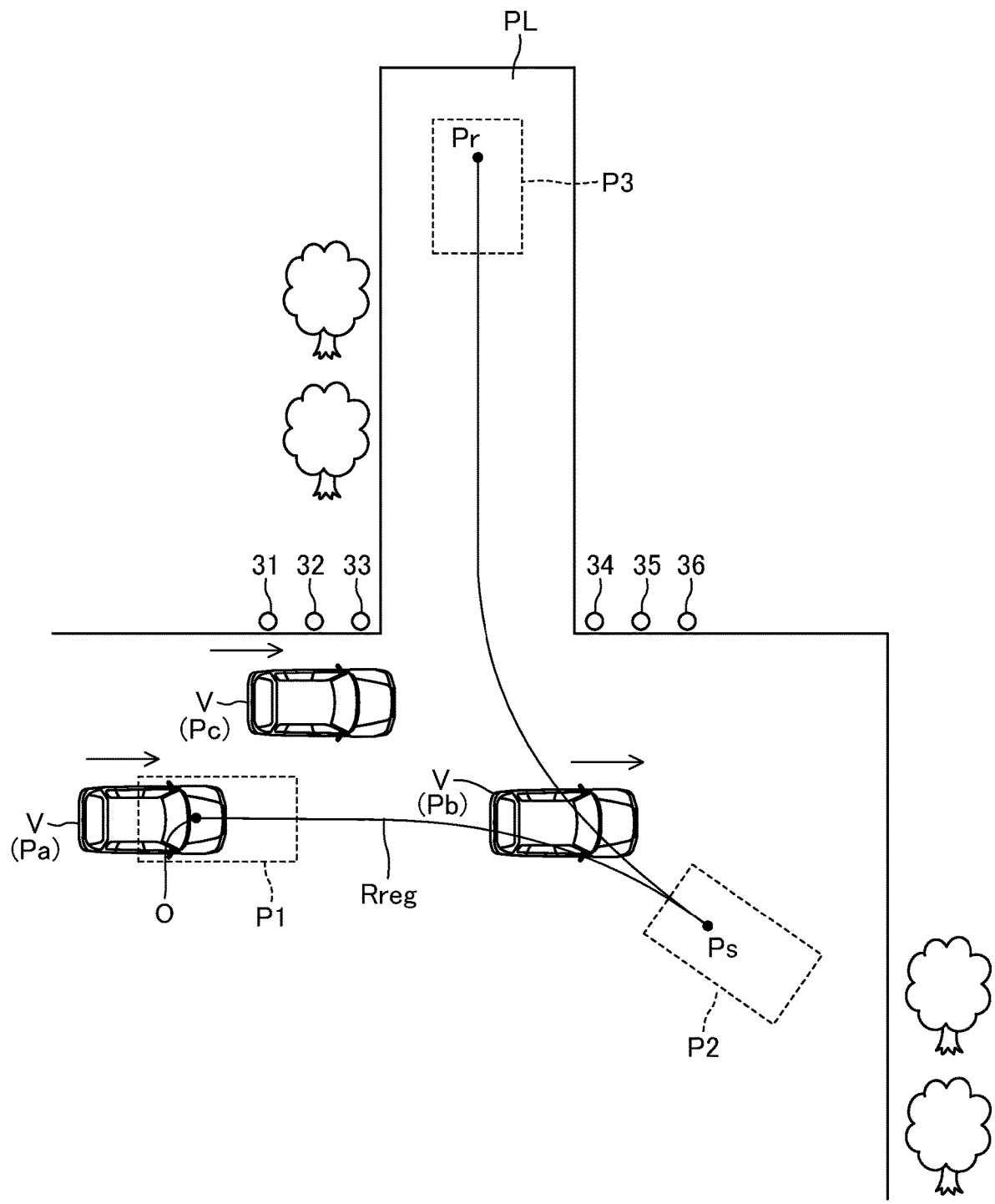
FIG. 8 is a diagram for illustrating the parking assist mode.

Next, the parking assist mode is described with reference to FIG. 7A to FIG. 11. FIG. 7A and FIG. 7B are flowcharts for illustrating a flow of processing by the CPU during the parking assist mode. FIG. 8 is a diagram for illustrating an example of scenes in which the own vehicle V passes through a position Pa, a position Pb, and a position Pc at a vehicle speed equal to or lower than a vehicle speed threshold value (for convenience of description, the respective scenes are hereinafter referred to as "case A," "case B," and "case C"). In the example of FIG. 8, the path R (see FIG. 5) is registered as the registered path Rreg.

The parking assist mode becomes available for use when the path R is registered in the registration mode. The parking assist mode is constantly maintained in the active state during a period in which the own vehicle V is traveling at a predetermined vehicle speed threshold value (for example, 30 km/h). Therefore, a switch operation is not required in order to start the parking assist mode. In other words, when a start condition which is described later (a condition that is satisfied when it is determined that parking assist control can be started (i.e., startable)) is satisfied during a period in which the vehicle V is traveling at a vehicle speed equal to or lower than the vehicle speed threshold value, the CPU notifies (proposes to) the driver that the parking assist control can be started regardless of whether or not the driver expresses an intention to use the parking assist control.

Therefore, when the vehicle speed drops to the vehicle speed threshold value or lower in a case in which the path R is registered, the parking assist mode is started in Step 700 of FIG. 7A. When the parking assist mode is started, the CPU advances the process to Step 705, and calculates the GPS position and the GPS azimuth at the current position based on the GPS signals. When the GPS signals cannot be received for some reason, the CPU advances the process to Step 730, which is described later.

Then, the CPU advances the process to Step 710, and determines whether or not the own vehicle V is traveling near the registered GPS position based on the GPS position calculated in Step 705 (in other words, whether or nota difference between the GPS position and the registered GPS position is equal to or less than a predetermined difference threshold value). This processing is introduced because the determination as to whether or not the start condition is satisfied is required only when the own vehicle V is traveling near the registered GPS position. The difference threshold value is set to a relatively large value in consideration of errors in the GPS signals. When the own vehicle V is traveling far from the registered GPS position ("No" in Step 710), the CPU returns the process to Step 705. Meanwhile, when the own vehicle V is traveling near the registered GPS position ("Yes" in Step 710), the CPU advances the process to Step 715. In the example of FIG. 8, all of the cases A to C are determined to be "Yes" in Step 710.

In Step 715, the CPU calculates the difference between the GPS azimuth calculated in Step 705 and the registered GPS azimuth.

The CPU then advances the process to Step 720, and generates the specific overhead view images based on the overhead view image data generated through use of the image data transmitted from the camera sensors 11. In addition, the CPU acquires the positions (relative positions with respect to the own vehicle V) of the three-dimensional objects (for example, the poles 31 to 36 in the example of FIG. 8) included in the three-dimensional object information transmitted from the first ultrasonic sensors 12 and the second ultrasonic sensors 13.

Then, the CPU advances the process to Step 725, and corrects the specific overhead view images and the positions of the three-dimensional objects, both being generated and acquired in Step 720, respectively, based on the azimuth difference calculated in Step 715. Specifically, the specific overhead view images and the positions of the three-dimensional objects are each rotated by the azimuth difference.

Then, the CPU advances the process to Step 730, and determines whether or not a feature point F and/or a registered three-dimensional object have/has been detected. Specifically, the CPU searches for the feature points F by performing template matching on the specific overhead view images corrected in Step 725. Template matching is well-known processing of searching a predetermined image for an image that is highly similar to a template image. The CPU uses each feature point F as a template image, and performs template matching over the entire area of the corrected specific overhead view images based on the grayscale information. When the corrected specific overhead view images include an image having a similarity degree which is equal to or more than a predetermined similarity degree threshold value, the CPU determines that a feature point F has been detected from that specific overhead view image. Further, the CPU searches for, among (the group of) the position coordinates of the registered three-dimensional objects, (a group of) position coordinates in which a distribution state of three-dimensional objects matches that of (a group of) the positions of the three-dimensional objects corrected in Step 725 (that is, (a group of) position coordinates having a matching degree equal to or more than a predetermined matching degree threshold value). When there exist(s) (a group of) the position coordinates having a matching degree equal to or more than the matching degree threshold value, the CPU determines that a registered three-dimensional object has been detected. In addition, when the first ultrasonic sensors 12 and the second ultrasonic sensors 13 are configured to be able to acquire the shape of three-dimensional objects, the CPU may detect registered three-dimensional objects in consideration of the shape of the three-dimensional objects.

When a feature point F and/or a registered three-dimensional object have/has been detected in this way ("Yes" in Step 730), the CPU advances the process to Step 735. Meanwhile, when a feature point F and a registered three-dimensional object are both not detected ("No" in Step 730), the CPU returns the process to Step 705. GPS signals may contain errors, and thus the own vehicle V may not actually be positioned near the registered GPS position even when the determination in Step 710 is "Yes." In such a case, the CPU determines "No" in Step 730. In the example of FIG. 8, all of the cases A to C are determined to be "Yes" in Step 730.

In Step 735, the CPU reads the position coordinates of the feature point F and/or the registered three-dimensional object detected in Step 730 from the ROM, and calculates the registered path Rreg based on the position coordinates.

Then, the CPU advances the process to Step 740 of FIG. 7B, and determines whether or not the start condition for the parking assist control is satisfied. The start condition is a condition which is satisfied when the parking assist control can be started at the current time. Specifically, the CPU calculates the relative position of the own vehicle V with respect to the registered path Rreg based on the relative position of the own vehicle V with respect to the detected feature point F and/or registered three-dimensional object, and based on the calculation result, determines whether the own vehicle V is positioned on the registered path Rreg. As used herein, "the own vehicle V is positioned on the registered path Rreg" means that at least a part of a vehicle body of the own vehicle V overlaps the registered path Rreg in plan view. The parking assist control cannot be started unless the own vehicle V is currently on the registered path Rreg. Therefore, when the own vehicle V is positioned on the registered path Rreg ("Yes" in Step 740), the CPU determines that there is a possibility that the start condition is satisfied, and advances the process to Step 745. Meanwhile, when the own vehicle V is not positioned on the registered path Rreg ("No" in Step 740), the CPU determines that the start condition is not satisfied, and advances the process to Step 770, which is described later.

In the example of FIG. 8, the own vehicle V is positioned on the registered path Rreg in the cases A and B, and deviates from the registered path Rreg in the case C. Therefore, the CPU determines "Yes" in Step 740 for the cases A and B, and determines "No" in Step 740 for the case C.

In Step 745, the CPU determines whether or not the own vehicle V can travel along the registered path Rreg. Specifically, the CPU calculates the relative azimuth of the own vehicle V with respect to the registered path Rreg based on the relative azimuth of the own vehicle V with respect to the detected feature point F and/or registered three-dimensional object. Then, the CPU determines, based on the relative position (see Step 740) and the relative azimuth of the own vehicle V with respect to the registered path Rreg, whether or not the own vehicle V can travel along the registered path Rreg when the current travel state is maintained. The parking assist control can be started when the own vehicle V can travel along the registered path Rreg. Therefore, when it is possible for the own vehicle V to travel ("Yes" in Step 745), the CPU determines that the start condition is satisfied, and advances the process to Step 750. Meanwhile, when it is not possible for the own vehicle V to travel ("No" in Step 745), the CPU determines that the start condition is not satisfied, and advances the process to Step 765, which is described later.

In the example of FIG. 8, in the case A, the own vehicle V is positioned on the registered path Rreg and the travel direction of the own vehicle V well matches the extending direction of the registered path Rreg. Meanwhile, for the case B, the own vehicle V is positioned on the registered path Rreg, but the travel direction of the own vehicle V largely deviates from the extending direction of the registered path Rreg. Therefore, the CPU determines "Yes" in Step 745 for the case A (that is, determines that the start condition is satisfied), and determines "No" in Step 745 for the case B (that is, determines that the start condition is not satisfied).

Figure 9:
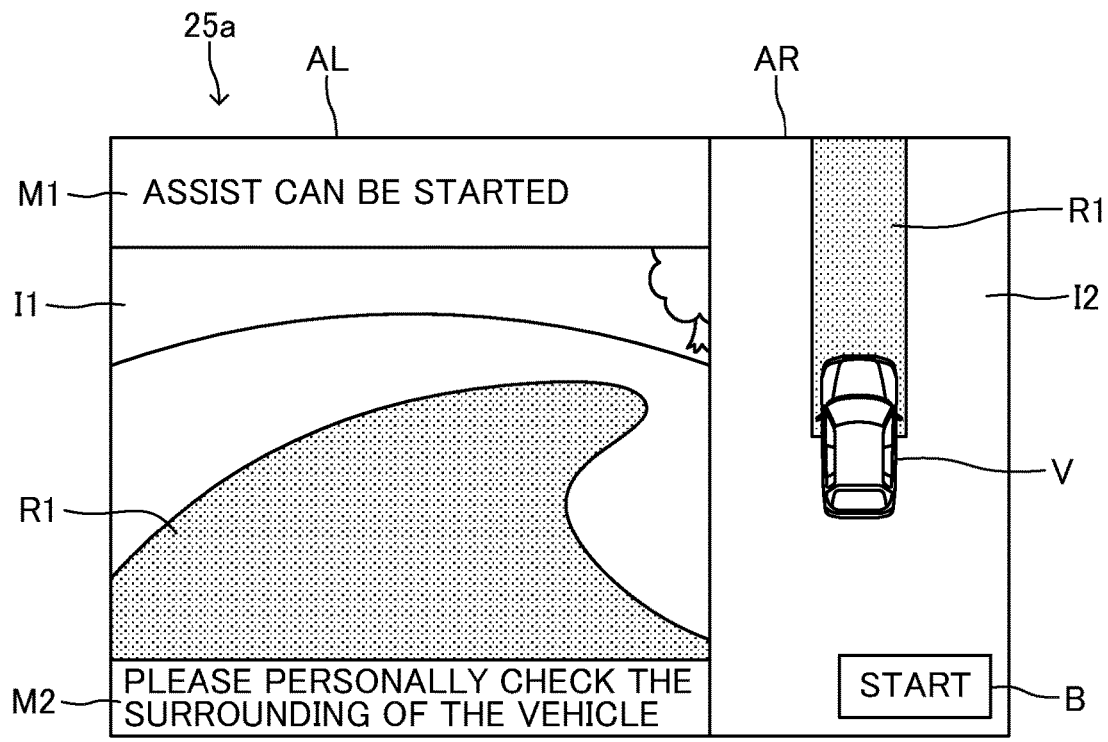
FIG. 9 is a diagram for illustrating one example of the display screen of when an own vehicle passes a position Pa of FIG. 8.

In Step 750, the CPU notifies the driver that the start condition is satisfied by performing various types of display on the display 25a. A specific description of this is now given with reference to FIG. 9. FIG. 9 is a diagram for illustrating a display image of the display 25a for the case A. As illustrated in FIG. 9, a travel direction image I1 and messages M1 and M2 are displayed in the display area AL of the display 25a, and an overhead view image I2 and a start button B are displayed in the display area AR (in the display 25a of FIG. 10 and subsequent diagrams, the reference symbols for the display areas AL and AR are omitted).

An assist-available area R1 is superimposed on the travel direction image I1. The assist-available area R1 in the example of FIG. 9 is an area indicating at least a part of a section (first section) in which the parking assist control can be started. The assist-available area R1 includes the registered path Rreg, and is displayed as an area having a predetermined width in a direction orthogonal to the registered path Rreg. In the example of FIG. 9, the portion of the registered path Rreg corresponding to the current shift position (that is, "D") (that is, the portion in which the own vehicle V moves forward under the parking assist control) is displayed as the area R1.

The message M1 is a message regarding whether or not the parking assist control can be started. In the example of FIG. 9, the start condition is satisfied, and the parking assist control can be started immediately (that is, at the current position). For this reason, the message "Assist can be started" (assist-available message) is displayed as the message M1. The message M2 is a message to alert the driver. In this specification, the message "Please personally check the surrounding of the vehicle" is displayed as the message M2 (for the display 25a of FIG. 10 and subsequent diagrams, description of the message M2 is omitted).

The assist-available area R1 is superimposed on the overhead view image I2. The display pattern of the area R1 is the same in the travel direction image I1 and the overhead view image I2. That is, the area R1 displayed in the overhead view image I2 is also displayed as the area of the portion of the registered path Rreg corresponding to the current shift position. The display magnification of the vehicle image of the own vehicle V in the overhead view image I2 is fixed, and the position of the vehicle image is fixed in the center of the overhead view image I2. Therefore, the display region of the area R1 displayed on the travel direction image I1 and the overhead view image I2 may not match.

The start button B is a button that is pressed (operated) by the driver to start the parking assist control. In the example of FIG. 9, the start condition is satisfied, and hence the start button B is displayed in an operable mode.

Thus, in Step 750, the CPU displays the assist-available area R1, the assist-available message, and the start button B (operable mode) on the display 25a.

Then, the CPU advances the process to Step 755, and determines whether or not the start button B has been pressed. When the start button B has not been pressed ("No" in Step 755), the CPU determines that the driver does not wish to start the parking assist control, and returns the process to Step 705. Meanwhile, when the start button B has been pressed ("Yes" in Step 755), the CPU determines that the driver wishes to start the parking assist control, and advances the process to Step 760.

In Step 760, the CPU starts the parking assist control along the registered path Rreg. Thereafter, the CPU advances the process to Step 795, and ends the processing.

Figure 10:
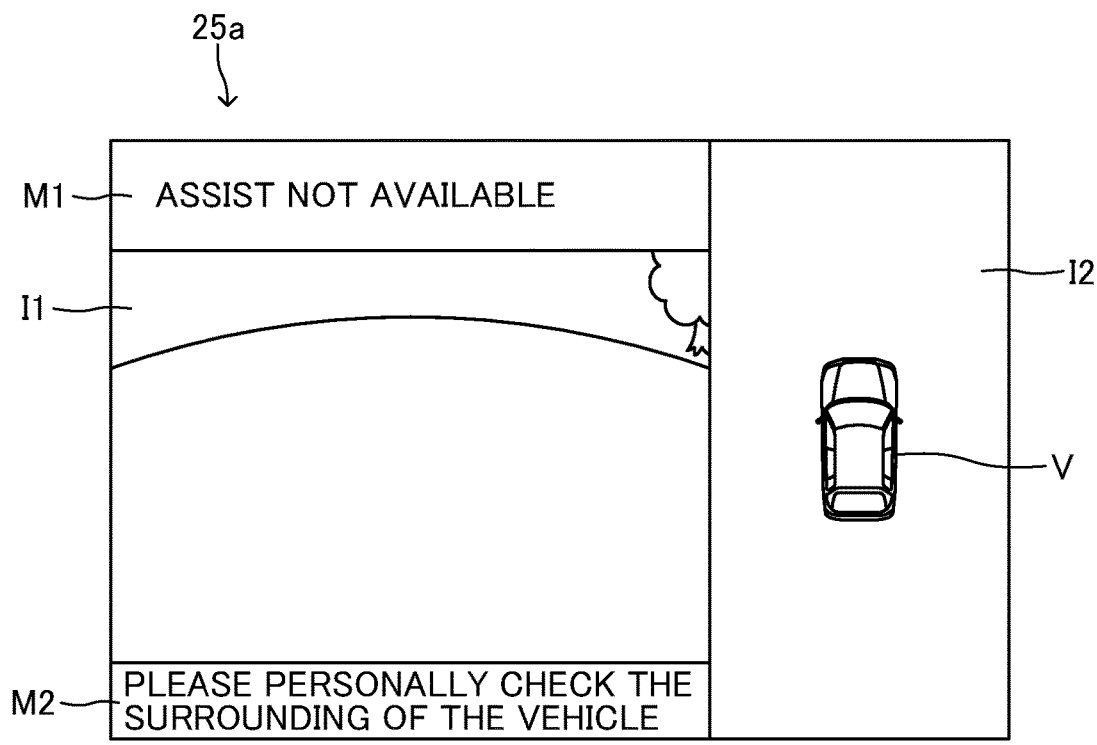
FIG. 10 is a diagram for illustrating one example of the display screen of when the own vehicle passes a position Pb of FIG. 8.

Meanwhile, when the determination is "No" in Step 745, the CPU advances the process to Step 765, and notifies the driver that the start condition is not satisfied by performing various types of display on the display 25a. A specific description is now given with reference to FIG. 10. FIG. 10 is a diagram for illustrating a display image of the display 25a in the case B. In the example of FIG. 10, the start condition is not satisfied, and hence it is not possible to start the parking assist control. That is, the assist-available area R1 does not exist. Therefore, the area R1 is not displayed on the travel direction image I1 and the overhead view image I2. Further, the message "Assist not available" (assist-unavailable message) is displayed as the message M1. In addition, the start button B is not displayed.

Thus, in Step 765, the CPU hides the start button B while displaying the assist-unavailable message on the display 25a. Then, the CPU returns the process to Step 705.

Meanwhile, when the determination is "No" in Step 740, the CPU advances the process to Step 770, and determines whether or not a merging condition for the parking assist control is satisfied. The merging condition is a condition which is satisfied when, even though it is impossible to start the parking assist control at the current time, there is a high possibility that the own vehicle V can merge with (i.e., the own vehicle V is enabled to merge with) the registered path Rreg based on a driving operation by the driver. Specifically, the CPU determines whether or not the own vehicle V can merge with the registered path Rreg when it is assumed that the own vehicle V is properly operated based on the relative position and the relative azimuth of the own vehicle V with respect to the registered path Rreg. When merging is possible ("Yes" in Step 770), the CPU determines that the merging condition is satisfied, and advances the process to Step 775. Meanwhile, when merging is not possible ("No" in Step 770), the CPU determines that the merging condition is not satisfied, and advances the process to Step 765. The processing step of Step 765 is as described above.

In the example of FIG. 8, in the case C, the own vehicle V is not positioned on the registered path Rreg (the start condition is not satisfied), but there is a high possibility that the own vehicle V can merge with the registered path Rreg if the driver turns the own vehicle V to the right while moving forward. Therefore, the CPU determines "Yes" in Step 770 for the case C (that is, determines that the merging condition is satisfied).

Figure 11:
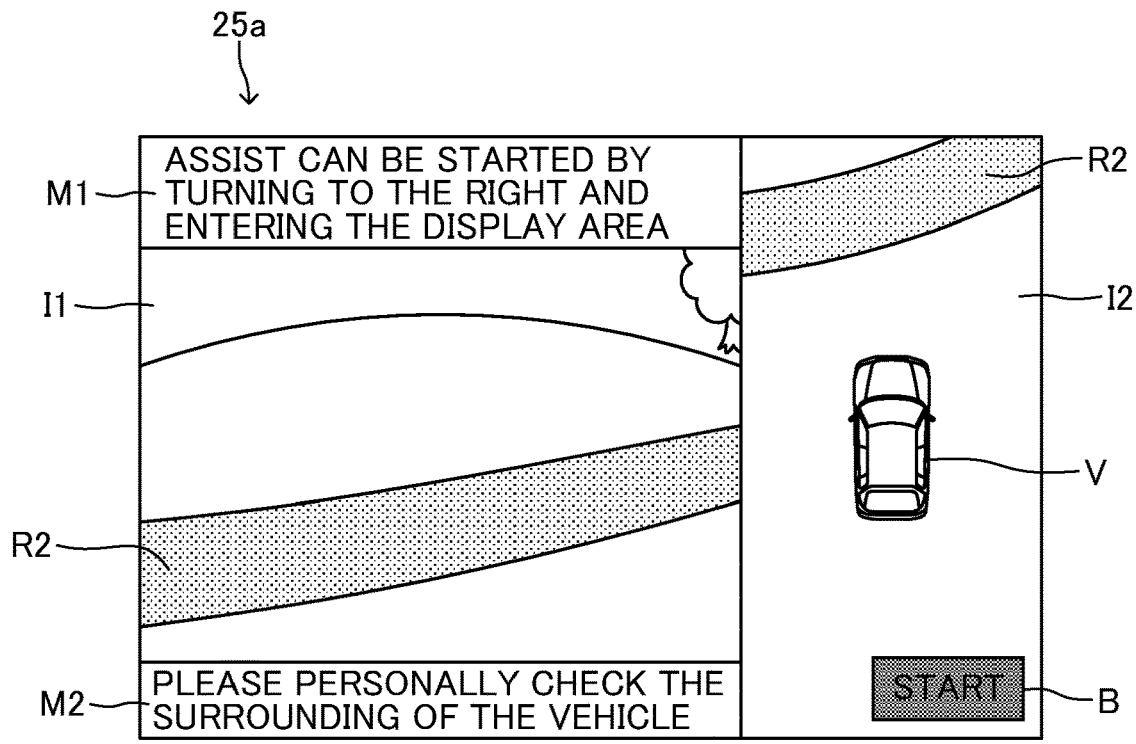
FIG. 11 is a diagram for illustrating one example of the display screen of when the own vehicle passes a position Pc of FIG. 8.

In Step 775, the CPU notifies the driver that the merging condition is satisfied by performing various types of display on the display 25a. A specific description of this is now given with reference to FIG. 11. FIG. 11 is a diagram for illustrating a display image of the display 25a in the case C. As illustrated in FIG. 11, an assist-available area R2 is superimposed on the travel direction image I1. The assist-available area R2 in the example of FIG. 11 is an area including a section (second section) in which merging with the registered path Rreg is possible. Like the example of FIG. 9, the assist-available area R2 includes the registered path Rreg and is displayed as an area having a predetermined width in the direction which is orthogonal to the registered path Rreg. This area R2 is a portion in which the own vehicle V reverses under the parking assist control. That is, in the example of FIG. 11, regardless of the current shift position (that is, "D"), the CPU displays, as the area R2, the portion of the registered path Rreg which includes the section (second section) with which the own vehicle V can merge.

Further, as the message M1, an advisory message regarding the driving operation required in order for the own vehicle V to merge with the assist-available area R2 (strictly speaking, the registered path Rreg) is displayed. In the example of FIG. 11, a message (advisory message) to the effect that "Assist can be started by turning to the right and entering the display area" is displayed.

The assist-available area R2 is superimposed on the overhead view image I2. The display pattern of the area R2 is the same in the travel direction image I1 and the overhead view image I2. In the example of FIG. 11, the start condition is not satisfied, and hence the start button B is displayed in an inoperable mode. Note that although the parking assist control cannot be started immediately at the current time, when the own vehicle V can merge with the area R2, it becomes possible for the control to be started immediately (the start button B becomes operable), and thus the start button B is displayed in an inoperable mode rather than not being displayed at all.

Thus, in Step 775, the CPU displays the assist-available area R2, the advisory message, and the start button B (inoperable mode) on the display 25a.

Thereafter, the CPU returns the process to Step 705. When the own vehicle V merges with the registered path Rreg based on a driving operation by the driver, the CPU determines "Yes" in both of Step 740 and Step 745 (determines that the start condition is satisfied), and advances the process to Step 750.

As described above, in the apparatus of the first embodiment, the assist-available area R1 is displayed on the display 25a when the start condition is satisfied. As a result, the driver can visually recognize the area in which the parking assist control can be started. Therefore, the driver can easily recognize how long the state in which the parking assist control can be started is to continue. With this configuration, it is possible to greatly reduce the possibility that the driver passes through the section in which the parking assist control is possible without noticing the section. In addition, the parking assist control can be started after the vehicle has moved to a point at which the driver can easily stop the vehicle among the section in which the parking assist control can be started. As a result, the convenience of the parking assist control can be significantly improved.

In addition, in the apparatus of the first embodiment, not only the positions of the feature points and the three-dimensional objects of the surrounding at the registration start position, but also the positions of the feature points and the three-dimensional objects of the surrounding of the path are registered. More specifically, the positions of the feature points and the three-dimensional objects are converted into position coordinates with respect to the reference point and then registered. Therefore, the parking assist control can be started even in the middle of the registered path, and hence the convenience of the parking assist control is further improved.

Further, in the apparatus of the first embodiment, the assist-available area R2 is displayed on the display 25a when the merging condition is satisfied. As a result, the driver can visually recognize that the parking assist control can be started by driving the own vehicle V so as to merge with the area R2. With this configuration, situations in which the parking assist control can be used increase, and the convenience of the control is further improved.

Further, in the first embodiment, an advisory message is displayed on the display 25a when the merging condition is satisfied. Through driving the own vehicle V based on the advisory message, the driver can properly merge the own vehicle V with the registered path Rreg (that is, can reduce the possibility of merging with the registered path Rreg from the opposite direction).

Figure 12:
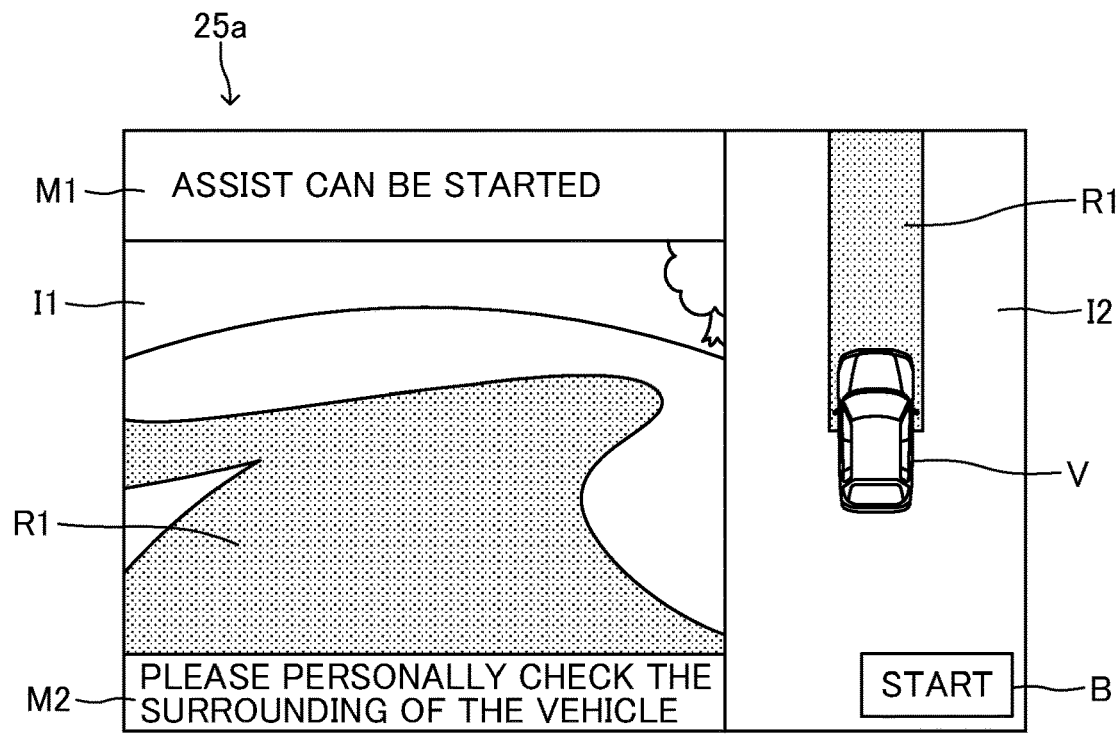
FIG. 12 is a diagram for illustrating another example of the display screen of when the own vehicle passes the position Pa of FIG. 8.
Figure 13:
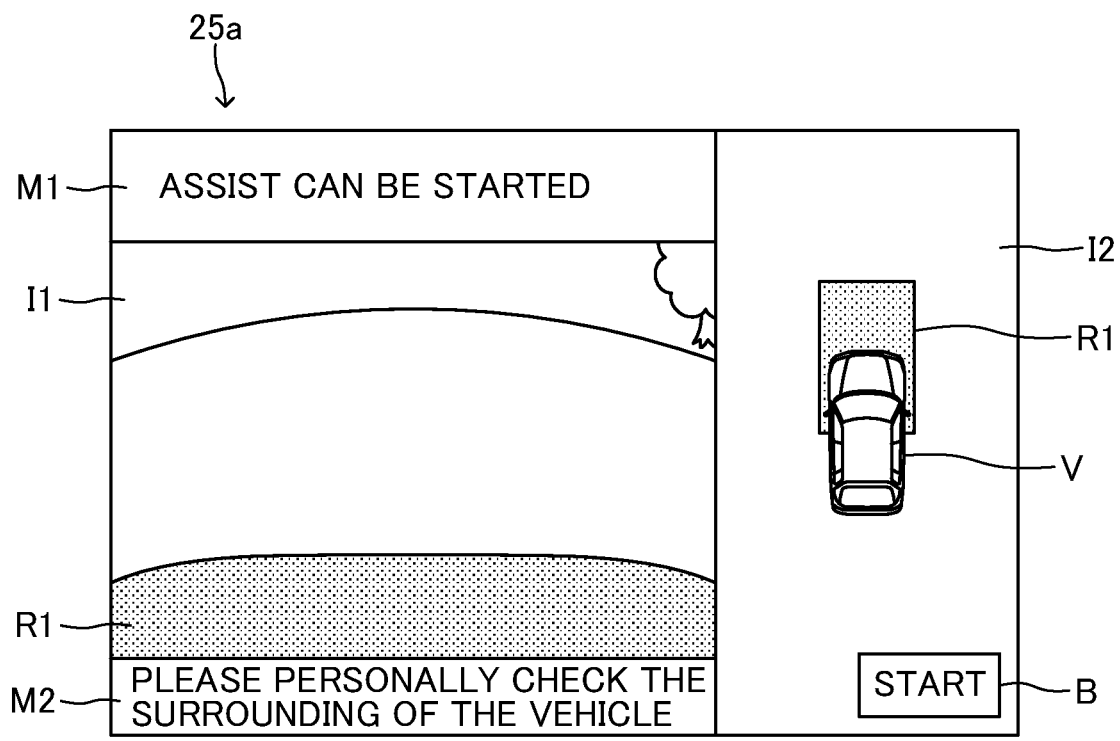
FIG. 13 is a diagram for illustrating yet another example of the display screen of when the own vehicle passes the position Pa of FIG. 8.

The display pattern of the assist-available area R1 displayed on the display 25a when the start condition is satisfied is not limited to the display pattern illustrated in FIG. 9. For example, as illustrated in FIG. 12, the apparatus of the first embodiment may be configured to display the entire registered path Rreg (that is, the portion in which the own vehicle V moves forward and the portion in which the own vehicle V reverses under the parking assist control) as the area R1 regardless of the current shift position. As another example, as illustrated in FIG. 13, the apparatus of the first embodiment may be configured to display only the surrounding at (of) the registration start position as the area R1.

Second Embodiment

Next, a parking assist apparatus according to a second embodiment of the present invention (hereinafter also referred to as "apparatus of the second embodiment") is described. In the second embodiment, constituent elements that are the same as in the first embodiment are denoted by the same reference symbols. This also applies to a third embodiment and a fourth embodiment of the present invention, which are described later.

Figure 14:
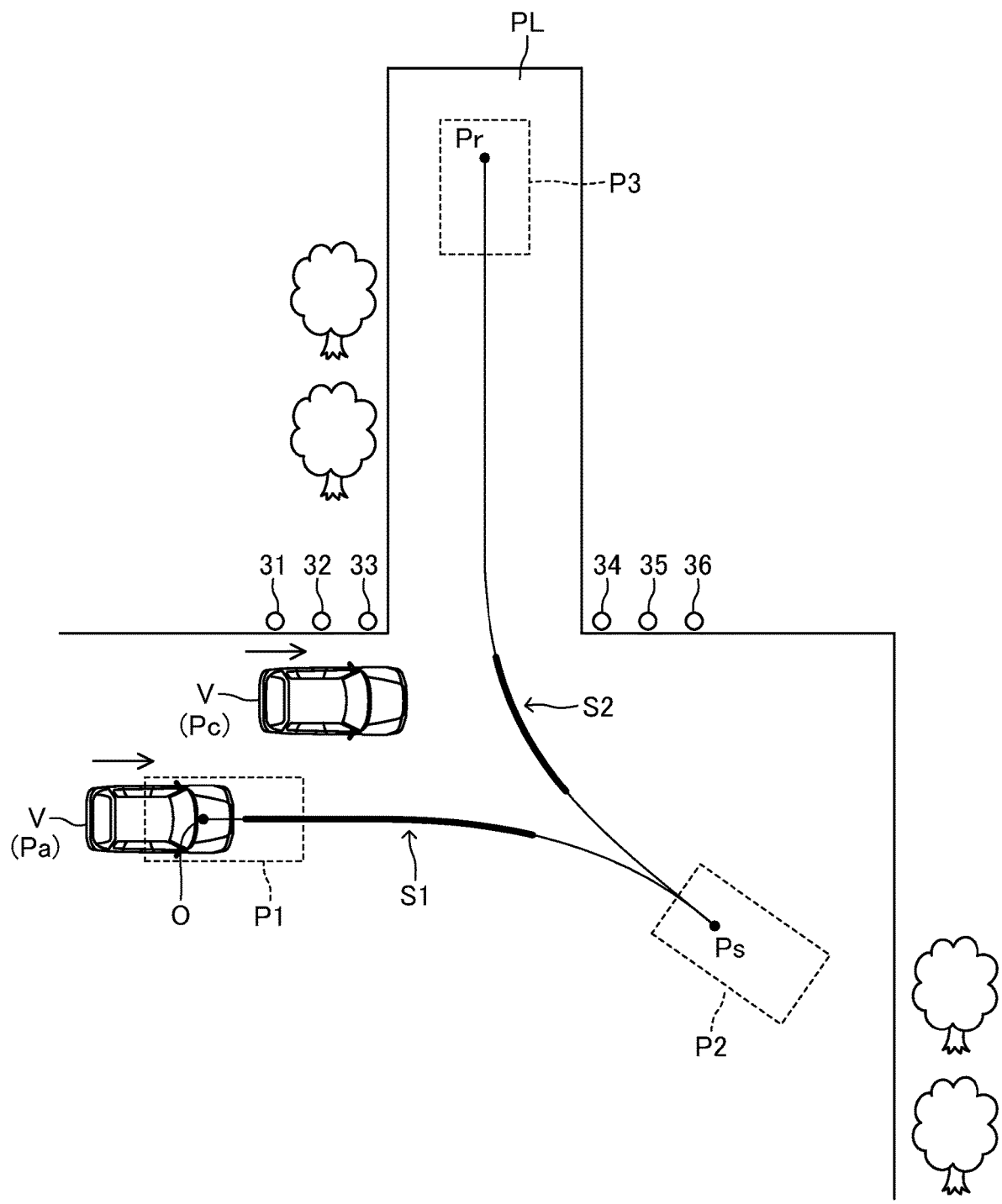
FIG. 14 is a diagram for illustrating a parking assist mode in a second embodiment of the present invention.

The apparatus of the second embodiment differs from the apparatus of the first embodiment in that the registered path Rreg is displayed on the display 25a in the form of an arrow (symbol) instead of in the form of an area. FIG. 14 is a diagram for illustrating an example of a scene in which the own vehicle V passes through the position Pa and the position Pc at a vehicle speed equal to or lower than the vehicle speed threshold value (for convenience of description, the respective scenes are referred to as "case D" and "case E" in order below). In the example of FIG. 14, the path R (see FIG. 5) is registered as the registered path Rreg. For the case D, the start condition is satisfied, and for the case E, the merging condition is satisfied.

When the start condition is satisfied ("Yes" in Step 745 of FIG. 7B), the CPU performs the following processing instead of the processing step of Step 750.

Assist-available arrow display
Assist-available message display
Start button display (operable mode)

Figure 15:
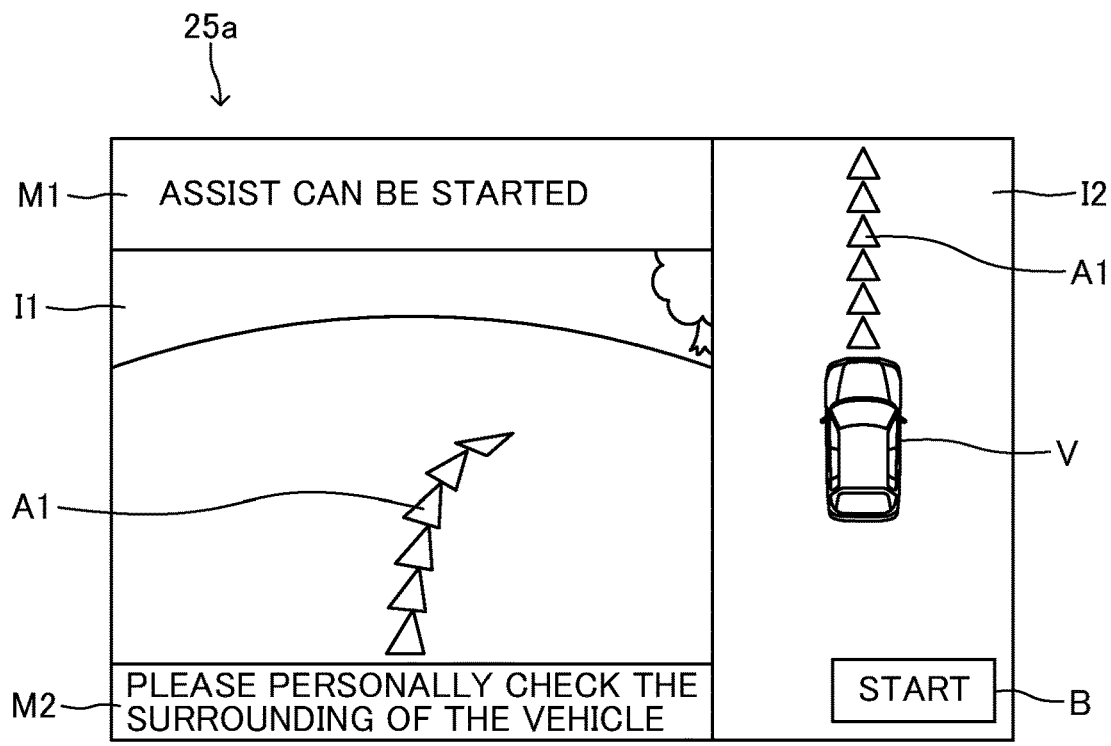
FIG. 15 is a diagram for illustrating assist-available arrows displayed on the display screen when the own vehicle passes a position Pa of FIG. 14.

A specific description of this is now given with reference to FIG. 15. FIG. 15 is a diagram for illustrating a display image of the display 25a in the case D. As illustrated in FIG. 15, assist-available arrows A1 are displayed on the travel direction image I1. The assist-available arrows A1 in the example of FIG. 15 are arrows indicating at least a part of a section (first section) in which the parking assist control can be started, and are arranged on the registered path Rreg. The direction of the arrows A1 indicates the travel direction of the own vehicle V. The range in which the arrows A1 are displayed in the travel direction image I1 corresponds to a section S1 (see the thick line) of FIG. 14, but the range in which the arrows A1 are displayed is not limited to this. However, when the registered path Rreg includes a portion in which the own vehicle V moves forward and a portion in which the own vehicle V reverses, only the part of the registered path Rreg corresponding to the portion overlapping with the own vehicle V (in the example of FIG. 14, the registered path Rreg from the origin O to the point Pc) is displayed as the arrows A1 (see FIG. 15). Further, the message "Assist can be started" is displayed as the message M1.

The assist-available arrows A1 are superimposed on the overhead view image I2. The display pattern of the arrows A1 is the same in the travel direction image I1 and the overhead view image I2. Further, the start button B is displayed in an operable mode.

In this way, the CPU displays the assist-available arrows A1, the assist-available message, and the start button B (operable mode) on the display 25a when the start condition is satisfied.

Further, when the merging condition is satisfied ("Yes" in Step 770 of FIG. 7B), the CPU performs the following processing instead of the processing step of Step 775.

Assist-available arrow display
Advisory message display
Start button display (inoperable mode)

Figure 16:
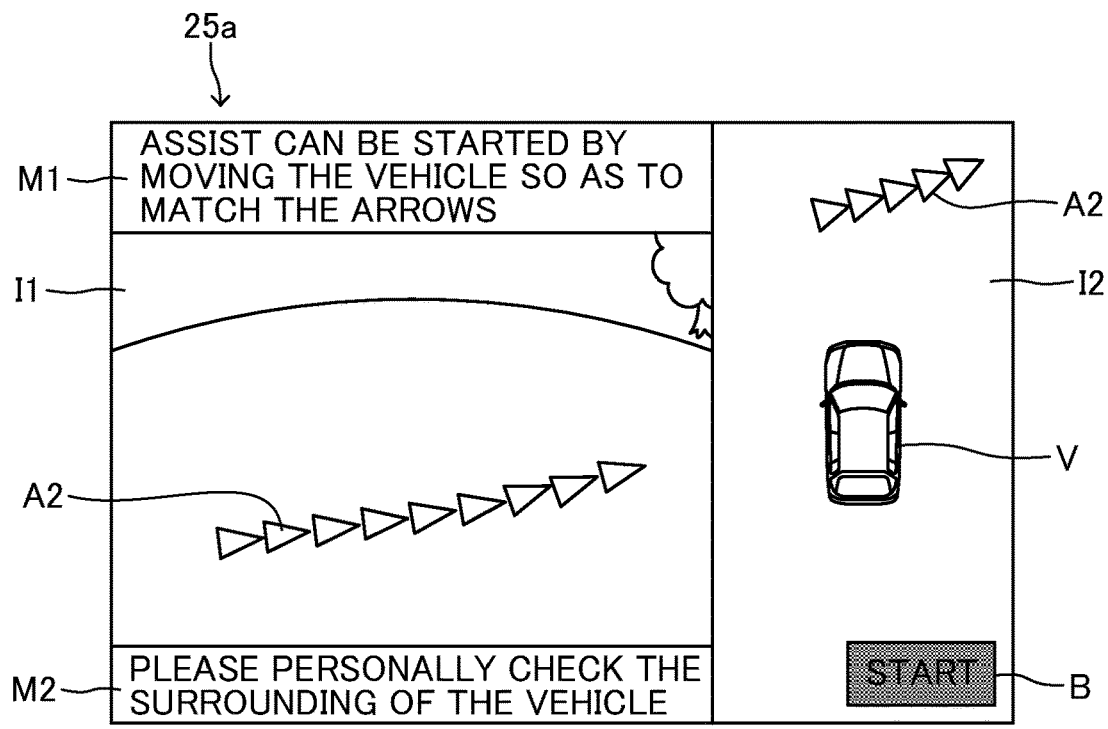
FIG. 16 is a diagram for illustrating assist-available arrows displayed on the display screen when the own vehicle passes a position Pc of FIG. 14.

A specific description of this is now given with reference to FIG. 16. FIG. 16 is a diagram for illustrating a display image of the display 25a in the case E. As illustrated in FIG. 16, assist-available arrows A2 are superimposed on the travel direction image I1. The assist-available arrows A2 in the example of FIG. 16 are arrows including a section (second section) in which merging with the registered path Rreg is possible, and like the example of FIG. 15, are arranged on the registered path Rreg. The direction of the arrows A2 indicates the travel direction for the own vehicle V to travel when merging. The range in which the arrows A2 are displayed on the travel direction image I1 corresponds to the section S2 (see the thick line) of FIG. 14. However, the range in which the arrows A2 are displayed is not limited to this.

Further, as the message M1, an advisory message regarding the driving operation required to merge the own vehicle V in the direction of the assist-available arrows A2 is displayed. In the example of FIG. 16, the message (advisory message) to the effect that "Assist can be started by moving the vehicle so as to match the arrows" is displayed.

The assist-available arrows A2 are superimposed on the overhead view image I2. The display pattern of the arrows A2 is the same in the travel direction image I1 and the overhead view image I2. Further, the start button B is displayed in an inoperable mode.

In this way, the CPU displays the assist-available arrows A2, the advisory message, and the start button B (inoperable mode) on the display 25*a* when the merging condition is satisfied.

In the apparatus of the second embodiment, the same actions and effects as those of the apparatus of the first embodiment can be achieved. In addition, in the apparatus of the second embodiment, the assist-available arrows A1 are displayed when the start condition is satisfied, and hence the driver can appropriately grasp the travel direction of the own vehicle V. Further, when the merging condition is satisfied, the assist-available arrows A2 are displayed, and thus the driver can grasp in which direction the own vehicle V is to be driven (moved), resulting in that the driver can more properly merge the own vehicle V with the registered path Rreg. The display mode of the registered path Rreg displayed on the display 25*a* is not limited to the arrows A1 or A2, and for example, a graphic representing a vehicle may be displayed on the registered path Rreg. For example, a plurality of those graphics may be arranged continuously or at intervals on the registered path Rreg. The direction of the vehicle graphics can be configured to indicate the travel direction of the own vehicle V when the start condition is satisfied, and to indicate the travel direction in which the own vehicle V is to travel in order to merge when the merging condition is satisfied. Even with this configuration, the same actions and effects as those of the apparatus of the second embodiment can be achieved.

Third Embodiment

Next, a parking assist apparatus according to the third embodiment (hereinafter also referred to as "apparatus of the third embodiment") is described. The apparatus of the third embodiment is different from the apparatus of the first and the second embodiments in that, when the start condition is satisfied, instead of displaying the registered path Rreg in the form of an area, a "remaining distance dr from the current position to the position at which the start condition becomes unsatisfied" is displayed on the display 25*a* as a section in which the parking assist control can be started. Further, the apparatus of the third embodiment is different from the apparatus of the first and second embodiments in that the apparatus of the third embodiment does not determine whether or not the merging condition is satisfied when the start condition is not satisfied.

Figure 17:
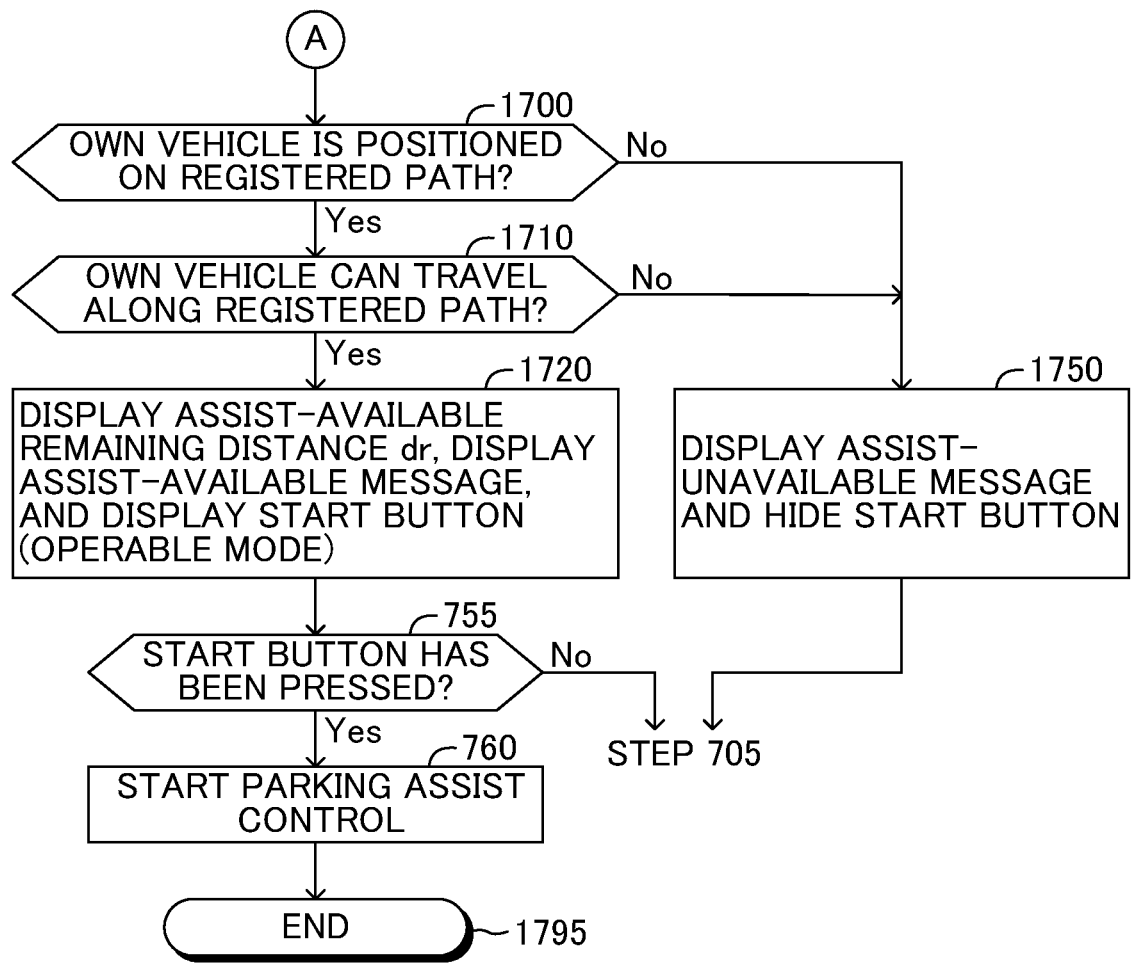
FIG. 17 is a flowchart for illustrating a flow of processing by the CPU of the ECU of a parking assist apparatus according to a third embodiment of the present invention.

In the third embodiment, the CPU executes processing in accordance with the flowchart illustrated in FIG. 17 instead of the flowchart illustrated in FIG. 7B. However, the same step numbers are given to the same processing steps as those of the flowchart of FIG. 7B.

When the registered path Rreg is calculated in Step 735 of FIG. 7A, the CPU advances the process to Step 1700 of FIG. 17, and determines whether the own vehicle V is positioned on the registered path Rreg. When the own vehicle V is positioned on the registered path Rreg ("Yes" in Step 1700), the CPU determines that there is a possibility that the start condition is satisfied, and advances the process to Step 1710. Meanwhile, when the own vehicle V is not positioned on the registered path Rreg ("No" in Step 1700), the CPU determines that the start condition is not satisfied, and advances the process to Step 1750, which is described later.

In Step 1710, the CPU determines whether or not the own vehicle V can travel along the registered path Rreg. When it is possible for the own vehicle V to travel ("Yes" in Step 1710), the CPU determines that the start condition is satisfied, and advances the process to Step 1720. Meanwhile, when it is not possible for the own vehicle V to travel ("No" in Step 1710), the CPU determines that the start condition is not satisfied, and advances the process to Step 1750.

Figure 18:
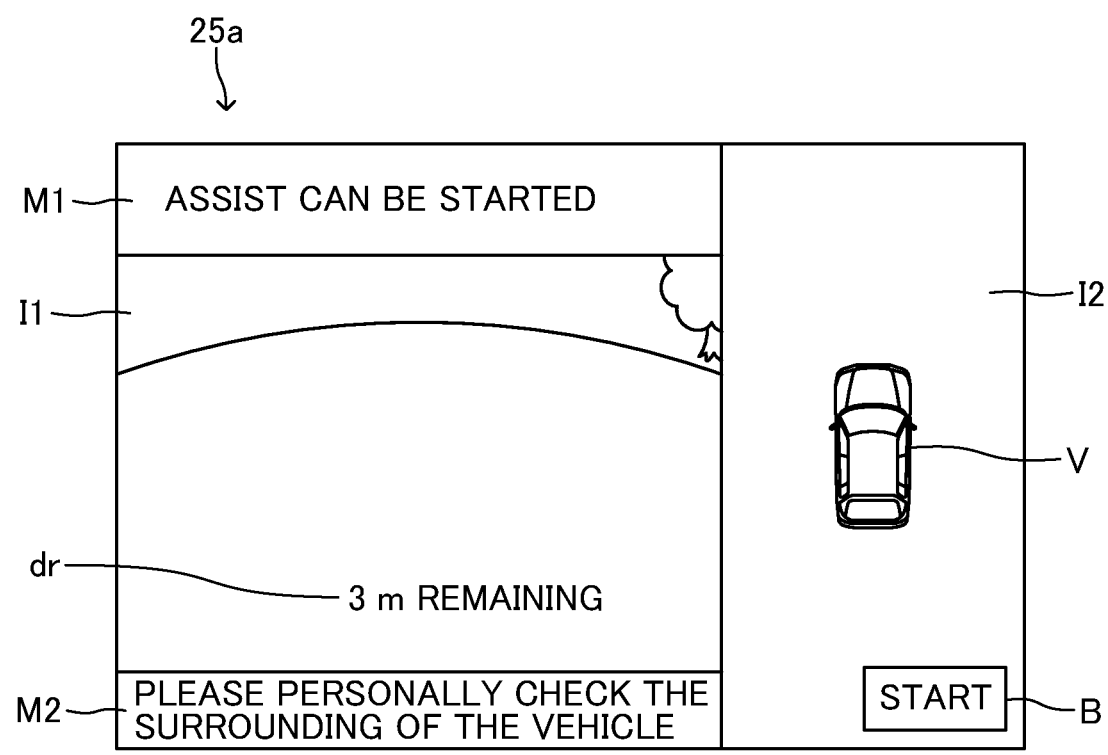
FIG. 18 is a diagram for illustrating a remaining distance displayed on the display screen.

In Step 1720, the CPU notifies the driver that the start condition is satisfied by performing various types of display on the display 25*a*. A specific description of this is now given with reference to FIG. 18. As illustrated in FIG. 18, in the travel direction image I1, the statement "3 m remaining" is displayed as the remaining distance dr. The remaining distance dr is the distance from the current position to the position at which the start condition becomes unsatisfied under an assumption that the own vehicle V continues to travel straight along the current travel direction when the start condition is satisfied. Further, the message "Assist can be started" is displayed as the message M1. In addition, the start button B is displayed in an operable mode in the overhead view image I2.

Thus, in Step 1720, the CPU displays the remaining distance dr, the assist-available message, and the start button B (operable mode) on the display 25*a*.

The subsequent processing steps are as described in the first and second embodiments. However, in Step 1750, the CPU hides the start button B while displaying an assist-unavailable message on the display 25*a* (see FIG. 10). That is, in the third embodiment, when it is determined that the own vehicle V is not positioned on the registered path Rreg, it is determined that the parking assist control cannot be started without determining whether or not the merging condition is satisfied.

In the apparatus of the third embodiment, the driver can visually recognize the section (first section) in which the parking assist control can be started by checking the remaining distance dr displayed on the display 25*a*. Therefore, the driver can easily recognize how long the state in which the parking assist control can be started is to continue.

Fourth Embodiment

Figure 19:
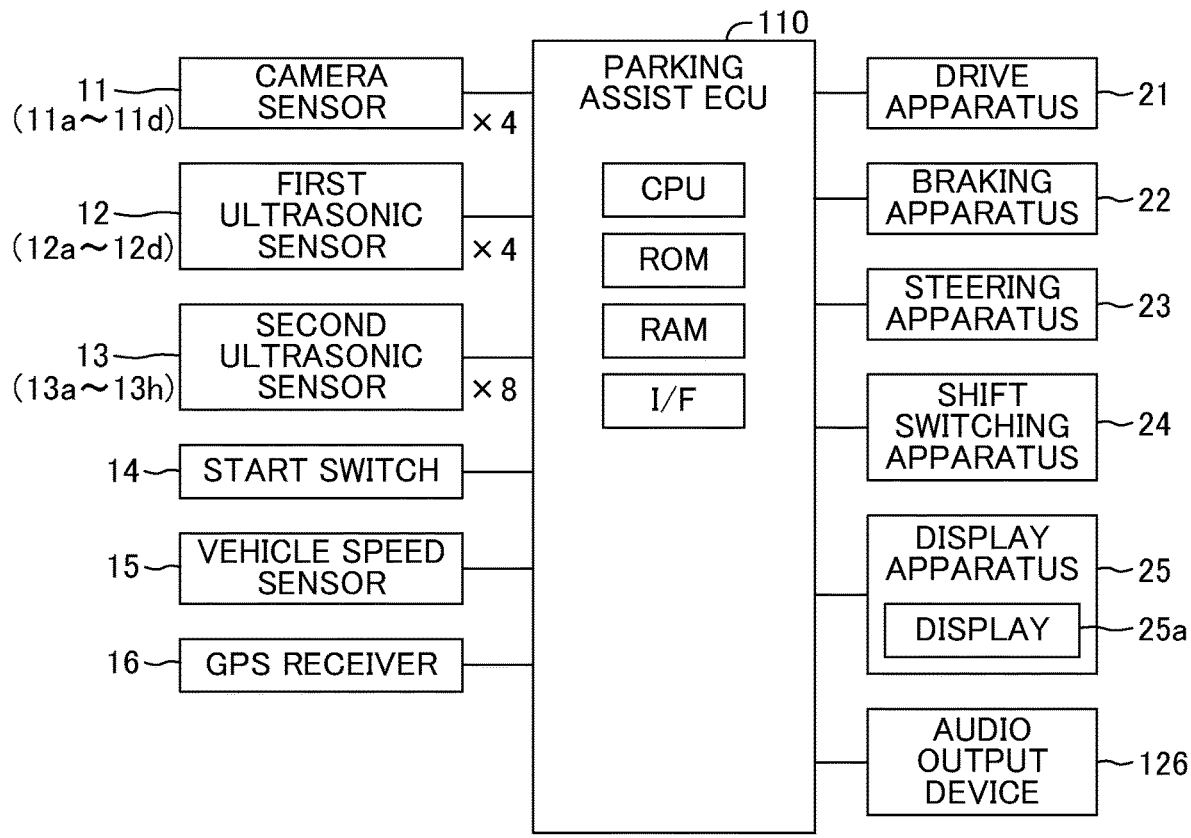
FIG. 19 is a schematic configuration diagram of a parking assist apparatus according to a fourth embodiment of the present invention.

Next, a parking assist apparatus according to the fourth embodiment (hereinafter also referred to as "apparatus of the fourth embodiment") is described. As illustrated in FIG. 19, an ECU 110 of the apparatus of the fourth embodiment includes an audio output device 126 capable of outputting a predetermined sound in addition to the elements included in the ECUs 10 of the apparatus of the first to third embodiments. The ECU 110 controls the audio output device 126.

The apparatus of the fourth embodiment is different from the apparatus of the third embodiment in that the apparatus of the fourth embodiment outputs a sound corresponding to the remaining distance dr as the section in which the parking assist control can be started. When the start condition is satisfied ("Yes" in Step 1710 of FIG. 17), the CPU performs the following processing instead of the processing step of Step 1720.

Audio output corresponding to remaining distance dr
Assist-available message display
Start button display (operable mode)

Figure 20:
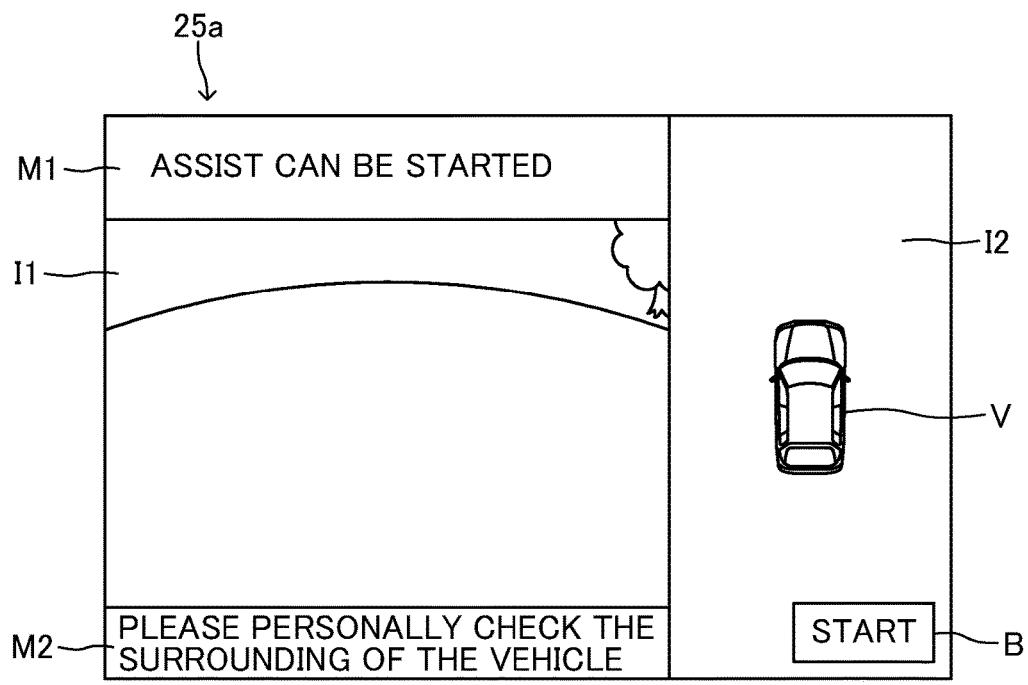
FIG. 20 is a diagram for illustrating an image displayed on the display screen.

Specifically, the audio output device 126 can repeatedly output a "beep" sound. The CPU controls the audio output device 126 so that the intervals between the "beep" sounds become shorter as the remaining distance dr becomes shorter. Further, in the fourth embodiment as well, as illustrated in FIG. 20, the display 25a displays the travel direction image I1, the messages M1 and M2, and the overhead view image I2 (including the start button B).

In this way, when the start condition is satisfied, the CPU causes the audio output device 126 to output a sound corresponding to the remaining distance dr, and displays the assist-available message and the start button B (operable mode) on the display 25a.

With this configuration, the driver can aurally recognize the section (first section) in which the parking assist control can be started by listening to the sound output from the audio output device (sound corresponding to the remaining distance). Specifically, the driver can grasp the remaining distance dr based on the interval between the sound. Therefore, the driver can easily recognize how long the state in which the parking assist control can be started is to continue.

In the above, the parking assist apparatuses according to the embodiments have been described, but the present invention is not limited to the above-mentioned embodiments, and various changes are possible within the range not departing from the object of the present invention.

For example, the present invention can also be applied to valet parking. Further, the type of parking is not limited to perpendicular parking, and may be parallel parking. Moreover, the ECU 10 (or ECU 110) may be configured to perform the parking assist control without using GPS signals. In addition, when the merging condition is satisfied, the advisory message may be notified to the driver by a sound instead of or in addition to the display of the advisory message.

The present invention can also be applied to a vehicle traveling by autonomous driving (by autonomous driving control).

What is claimed is:

1. A parking assist apparatus, comprising:
an image pickup device configured to acquire image information by photographing a surrounding of a vehicle;
a three-dimensional object information acquisition device configured to acquire three-dimensional object information including a position of a three-dimensional object present in the surrounding of the vehicle;
a display screen arranged at a position visible to the driver, in which an overhead view image generated based on the image information and a travel direction image which displays an area in a travel direction of the vehicle are displayed; and
a control unit configured to execute parking assist control including registration mode which is control of registering, in advance, a path along which the vehicle has traveled when a driver of the vehicle has driven the vehicle from a predetermined start position to a predetermined parking position as a registered path, and parking assist mode which is control of parking the vehicle in the predetermined parking position by automatically moving the vehicle along the registered path,
wherein the control unit is configured to:
in the registration mode, during a period in which the driver is driving the vehicle from the predetermined start position to the predetermined parking position, each time the vehicle travels a predetermined first distance, acquire a position of the three-dimensional object included in the three-dimensional object information, and calculate a relative position of the vehicle with respect to the predetermined start position, and each time the vehicle travels a predetermined second distance which is larger than the predetermined first distance, extract a feature point of a road surface from the overhead view image;
register a group of position coordinates of the relative positions of the vehicle with respect to a predetermined reference point in a storage device as the registered path together with a position coordinate of the feature point and a position coordinate of the three-dimensional object with respect to the predetermined reference point;
calculate, when the feature point and/or the three-dimensional object registered is/are detected near the registered path based on the overhead view image and the three-dimensional object information, the registered path based on the position coordinate of the feature point and/or the position coordinate of the three-dimensional object; and
notify the driver, by displaying on both the overhead view image and the travel direction image in the display screen, a first section in which the parking assist control is startable when a start condition is satisfied, the start condition being satisfied when the vehicle is positioned on the registered path and the vehicle can travel along the registered path based on the relative position and a relative azimuth of the vehicle with respect to the registered path, and by displaying an assist-available message indicating that assist can be started in the display screen.

2. The parking assist apparatus according to claim 1, wherein the control unit is configured to display, when the start condition is satisfied, the first section on both the overhead view image and the travel direction image as one of an area including the registered path or a symbol or graphic indicating the travel direction of the vehicle on the registered path.

3. The parking assist apparatus according to claim 1, wherein the control unit is configured to notify the driver, by displaying on both the overhead view image and the travel direction image, a second section in which the vehicle is enabled to merge with at least the registered path when a merging condition is satisfied, the merging condition being satisfied when it is determined that the vehicle is enabled to merge with the registered path based on the relative position and the relative azimuth of the vehicle with respect to the registered path in a case when the start condition is not satisfied.

4. The parking assist apparatus according to claim 3, wherein the control unit is configured to provide, by display or a sound, an advisory message regarding a driving operation required for merging with the second section when the merging condition is satisfied.

5. The parking assist apparatus according to claim 3, wherein the control unit is configured to display, when the merging condition is satisfied, the second section on both the overhead view image and the travel direction image as one of an area including the registered path or a symbol or graphic indicating a travel direction of the vehicle on the registered path.

6. The parking assist apparatus according to claim 4, wherein the control unit is configured to display, when the merging condition is satisfied, the second section on both the overhead view image and the travel direction image as one of an area including the registered path or a symbol or graphic indicating a travel direction of the vehicle on the registered path.

7. The parking assist apparatus according to claim 1,
wherein the control unit is configured to display, when the start condition is satisfied and the parking assist control is not yet started, a remaining distance as the first section on the display screen, the remaining distance being a distance from a current position to a position at which the start condition becomes unsatisfied under an assumption that the vehicle continues to travel straight along a current travel direction.

8. The parking assist apparatus according to claim 1, further comprising an audio output device configured to output a predetermined sound,
wherein the control unit is configured to cause, when the start condition is satisfied and the parking assist control is not yet started, the audio output device to output a sound corresponding to a remaining distance as the first section, the remaining distance being a distance from a current position to a position at which the start condition becomes unsatisfied under an assumption that the vehicle continues to travel straight along a current travel direction.

* * * * *